United States Patent
Xiao

(10) Patent No.: US 7,036,926 B2
(45) Date of Patent: *May 2, 2006

(54) MAGNETIC FLAPPABLE SHELTER FRAME KIT FOR GLASSES

(76) Inventor: Tony Xin Xiao, 1235 Lindengrove Ave., Rowland Heights, CA (US) 91748

( * ) Notice: Subject to any disclaimer, the term of this patent is extended or adjusted under 35 U.S.C. 154(b) by 0 days.

This patent is subject to a terminal disclaimer.

(21) Appl. No.: 10/306,033

(22) Filed: Nov. 26, 2002

(65) Prior Publication Data
US 2003/0081167 A1    May 1, 2003

Related U.S. Application Data

(62) Division of application No. 09/799,891, filed on Mar. 7, 2001, now Pat. No. 6,601,953.

(60) Provisional application No. 60/209,894, filed on Jun. 6, 2000.

(51) Int. Cl.
G02C 7/08 (2006.01)

(52) U.S. Cl. ............... 351/57; 351/47; 2/443

(58) Field of Classification Search ............. 351/47, 351/57, 41, 90, 98, 59, 48, 153, 51, 52; 2/441, 2/443, 13, 15
See application file for complete search history.

(56) References Cited

U.S. PATENT DOCUMENTS

| | | | | |
|---|---|---|---|---|
| 2,640,390 A * | 6/1953 | Muncy | ...... | 351/59 |
| 4,955,707 A * | 9/1990 | Gazeley | ...... | 351/47 |
| 5,335,025 A * | 8/1994 | Wang | ...... | 351/47 |
| 5,568,207 A * | 10/1996 | Chao | ...... | 351/57 |
| 5,975,691 A * | 11/1999 | Ku | ...... | 351/47 |
| 6,116,732 A * | 9/2000 | Xiao | ...... | 351/47 |
| 6,132,040 A * | 10/2000 | Xiao | ...... | 351/47 |
| 6,164,774 A * | 12/2000 | Cate | ...... | 351/47 |
| 6,170,949 B1 * | 1/2001 | Mauch | ...... | 351/47 |
| 6,244,704 B1 * | 6/2001 | Xiao | ...... | 351/47 |
| 6,331,057 B1 * | 12/2001 | Strube | ...... | 351/47 |
| RE37,545 E * | 2/2002 | Chao | ...... | 351/57 |
| 6,343,858 B1 * | 2/2002 | Zelman | ...... | 351/47 |
| 6,364,478 B1 * | 4/2002 | Jagasia | ...... | 351/47 |
| 6,367,926 B1 * | 4/2002 | Chao et al. | ...... | 351/47 |
| 6,382,787 B1 * | 5/2002 | Xie | ...... | 351/47 |
| 6,402,318 B1 * | 6/2002 | Xiao | ...... | 351/57 |
| 6,412,941 B1 * | 7/2002 | Xiao | ...... | 351/47 |
| 2002/0057415 A1 * | 5/2002 | Xiao | ...... | 351/86 |
| 2003/0081168 A1 * | 5/2003 | Xiao | ...... | 351/47 |

* cited by examiner

Primary Examiner—Henry Bennett
Assistant Examiner—Dinnatia Doster-Greene
(74) Attorney, Agent, or Firm—Raymond Y. Chan; David & Raymond

(57) ABSTRACT

A shelter frame kit is adapted for detachably mounting in front of a primary spectacle frame wherein the shelter frame kit for supporting two auxiliary lenses includes a bridge extended between the two auxiliary lenses, two shelter arms having two pivot hinges affixed on upper sides of the two auxiliary lenses respectively, and two interlocking device provided at two ends of the two shelter arms respectively for interlocking with two rim lockers of the primary spectacle frame such that the auxiliary lenses are adapted for pivotally folding from a closed position to an open position, wherein in the closed position of the shelter frame kit, the two auxiliary lenses are respectively positioned in front of two lenses of the primary spectacle frame, and in the opened position of the shelter frame kit, the two auxiliary lenses are 180-degree flipped over the two lenses of the primary spectacle frame respectively.

20 Claims, 31 Drawing Sheets

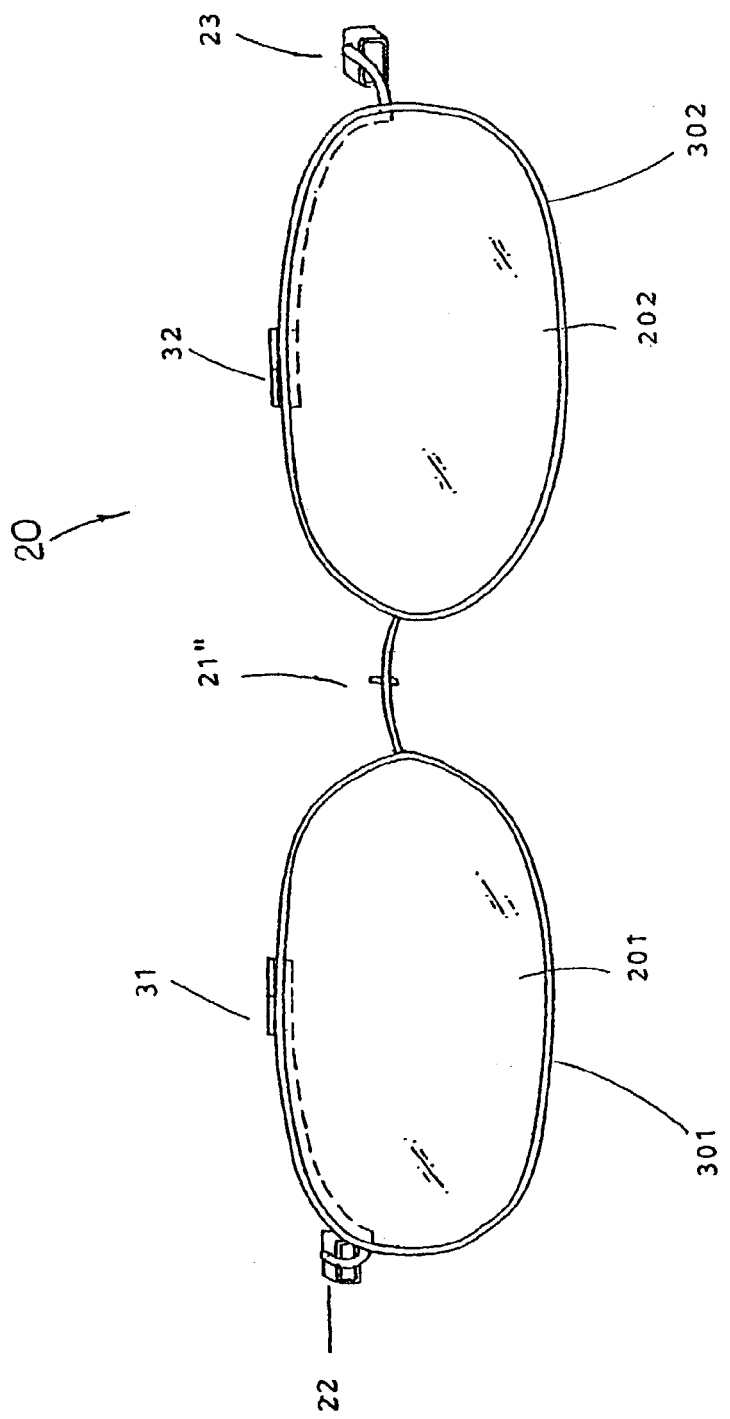
FIG 12
FIG 13

US 7,036,926 B2

1

MAGNETIC FLAPPABLE SHELTER FRAME KIT FOR GLASSES

CROSS REFERENCE RELATED TO THE APPLICATION

This is a divisional application of a non-provisional application, application Ser. No. 09/799,891, filed on Mar. 7, 2001, now U.S. Pat. No. 6,601,953 which is a regular application of a provisional application, application No. 60/209,894, filed Jun. 06, 2000.

BACKGROUND OF THE PRESENT INVENTION

1. Field of Invention

The present invention relates to a spectacle frame, and more particularly to a shelter frame kit for supporting auxiliary lenses, such as sunglasses, wherein the shelter frame kit is adapted for detachably mounting on a primary spectacle frame by means of a magnetic means equipped with an interlocking engagement in such a manner that the shelter frame kit is capable of pivotally coupling the primary spectacle frame in a position between 0 and 180 degrees.

2. Description of Related Arts

An auxiliary shelter frame is widely used today for mounting on a primary spectacle frame, especially an auxiliary shelter frame with magnetic attachment is even commonly used in recent market. The advantage of the magnetic shelter frame is that when the shelter frame is placed in front of the primary spectacle frame, due to the magnetic attraction, the shelter frame will be automatically guided and attracted by the primary spectacle frame having magnet embedded thereon, so as to securely mount the shelter frame in front of the primary spectacle frame. Thus, the wearer can easily use one hand to attach or detach the shelter frame during exercising or driving.

However, even though the shelter frame can be detached easily from the primary spectacle frame, the wearer cannot take out the shelter frame in such a quick response especially when the wearer has to switch the shelter frame back and forth on the primary spectacle. For example, when the wearing is driving through a tunnel, the wearer may need to detach the shelter frame when entering the tunnel and attach the shelter frame back on the primary spectacle frame after exiting the tunnel. The detaching and attaching operation of the shelter frame on the primary spectacle frame will give trouble to the wearer because the wearer may pay more attention on the operation of the shelter frame rather than on the road, which is dangerous while driving. Beside the drivers, it is also inconvenient for many wearers such as golf prayers and baseball players having outdoor activities, who have to switch the shelter frame back and forth on the primary spectacle frame.

Moreover, since the primary spectacle frame comprises magnets embedded thereon, which will increase the weight of the primary spectacle frame, such that the wearer may feel uncomfortable because of the additional weight of the primary spectacle frame even though the shelter frame is detached therefrom. Moreover, it is known that the magnets produce magnetic field which may affect the blood circulation of a human being. When the wearer always wear the primary spectacle frame having the magnets embedded thereon, the magnetic field produced by those magnets may cause eye infection or even serious headache for the wear.

Thus, the magnets embedded on the primary spectacle frame may not only adversely affect the entire ornamental appearance of the primary spectacle frame but also limit the designers to create and design new style of the frames in the fashion market.

SUMMARY OF THE PRESENT INVENTION

A main object of the present invention is to provide a shelter frame kit for glasses, wherein the shelter frame kit is pivotally coupling a primary spectacle frame so as to open and close the shelter frame kit from the primary spectacle frame quickly and easily.

Another object of the present invention is to provide a shelter frame kit for glasses, wherein the shelter frame kit is adapted for detachably and precisely mounting on the primary spectacle frame by magnetic attraction. Moreover, the shelter frame kit is arranged to interlock with the primary spectacle frame so that the shelter frame kit is securely mounted on the primary spectacle frame.

Another object of the present invention is to provide a shelter frame kit for glasses, wherein the primary spectacle frame comprises a pair of rim lockers for interlocking two lenses in position respectively, wherein the rim lockers are made of soft-magnetic metal having magnetic attraction ability such that no magnet is needed to embed on the primary spectacle frame. In other words, the primary spectacle frame does not require to alter the original structural design.

Another object of the present invention is to provide a shelter frame kit for glasses, wherein the supporting arms of the shelter frame kit is not only magnetically attracted to but also interlocked with the rim lockers of the primary spectacle frame respectively, so as to prevent up and down movement or sideward movement of the shelter frame kit with respect to the primary spectacle frame once the shelter frame kit is mounted in position.

Another object of the present invention is to provide a shelter frame kit for glasses, wherein the depth of the magnet seat of the rim lockers can be adjusted so as to minimum a distance between the primary spectacle frame and the shelter frame kit. In other words, the shelter frame kit can be adjustably mounted in the front of the primary spectacle frame according to a thickness thereof.

Another object of the present invention is to provide a shelter frame kit for glasses, wherein even though the shelter frame kit is magnetically attracted and interlocked with the primary spectacle frame, the wearer still may merely use one hand to attach or detach the shelter frame kit during exercising or driving.

Another object of the present invention is to provide a shelter frame kit for glasses, wherein no magnet is needed to embed on the primary spectacle frame so as to further reduce the weight of the primary spectacle frame. Furthermore, the ornamental appearance of the primary spectacle frame can be maintained wherein the primary spectacle frame is exactly identical to a common spectacle frame even though the shelter frame kit is removed.

Another object of the present invention is to provide a shelter frame kit for glasses wherein the primary spectacle frame does not require to alter its original structural design, so as to minimize the manufacturing cost of the primary spectacle frame incorporating with the shelter frame kit.

Accordingly, in order to accomplish the above objects, the present invention provides a shelter frame kit adapted for detachably mounting in front of a primary spectacle frame which comprises a frame body having a pair of lens rims for mounting a pair of lenses in position wherein each lens rim comprises a rim locker for securely locking up the lens within the respective lens rim. The frame body comprises a primary bridge connected between the two lenses and two side extension arms provided at two outer sides of the lenses respectively each having a hinge portion rearwardly extended therefrom for pivotally coupling a temple.

The shelter frame kit for supporting two auxiliary lenses comprises a bridge extended between the two auxiliary lenses, two shelter arms having two pivot hinges affixed on upper sides of the two auxiliary lenses respectively, and two interlocking means provided at two ends of the two shelter arms respectively for interlocking with the two rim lockers of the frame body of the primary spectacle frame in such a manner that the auxiliary lenses of the shelter frame kit are adapted for pivotally folding from a closed position to an open position, wherein the closed position of the shelter frame kit, the two auxiliary lenses are respectively positioned in front of the two lenses of the primary spectacle frame, and in the opened position of the shelter frame kit, the two auxiliary lenses are 180-degree flipped over the two lenses of the primary spectacle frame at the two pivot hinges respectively.

Each of the interlocking means comprises a supporting arm rearwardly extended from the shelter frame kit, and a magnetic seat which comprises a magnet housing downwardly connected from the supporting arm for magnetically attracting from behind the frame body and engaging with the respective rim locker, so as to securely mount the shelter frame kit in front of the primary spectacle frame.

In order to mount the shelter frame kit in front of the frame body of the primary spectacle frame, simply put the shelter frame kit in front of the primary spectacle frame and drop it down. Due to the magnetic attraction, the two magnetic seats of the shelter frame kit are magnetically attracted from behind to engage with the two rim lockers of the frame body of the primary spectacle frame respectively. Thus, the two interlocking means of the shelter frame kit are respectively interlocked with the frame body of the primary spectacle frame. So, the present invention provides not only the magnetic attraction but also the interlocking engagement for securely mounting the shelter on the primary spectacle frame. For opening the two auxiliary lenses, simply flip over the auxiliary lenses about the pivot hinges such that the auxiliary lenses are adapted to pivotally rotate 180 degrees from the closed position.

BRIEF DESCRIPTION OF THE DRAWINGS

FIG. 12 illustrates an alternative mode of the bridge lock of the shelter frame kit according to the above first preferred embodiment of the present invention.

FIG. 13 is a side sectional view of the bridge lock of the shelter frame kit according to the above first preferred embodiment of the present invention.

DETAILED DESCRIPTION OF THE PREFERRED EMBODIMENT

Figure 1A:
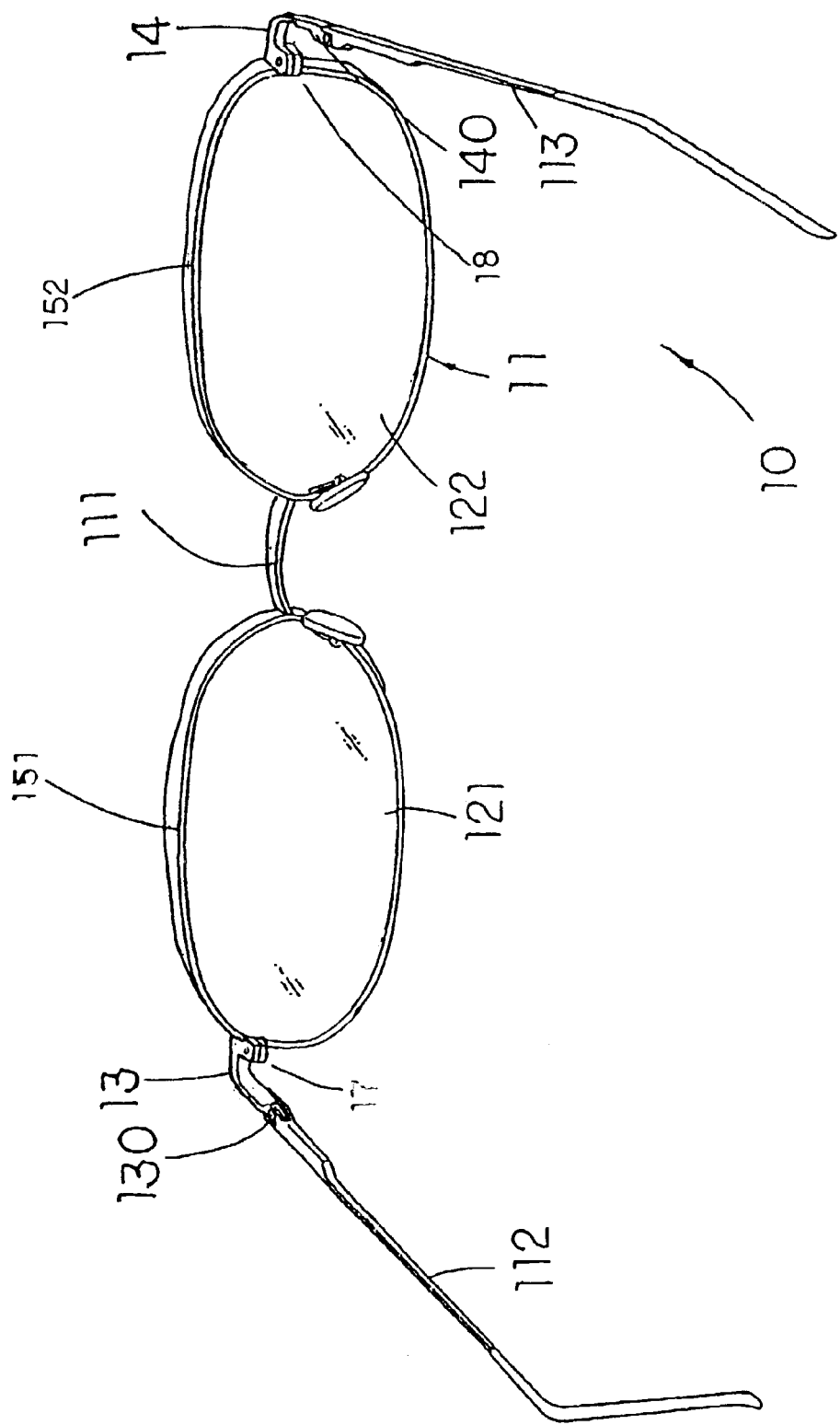
FIG. 1A is a rear perspective view of a primary spectacle frame according to a first preferred embodiment of the present invention.

Referring to FIGS. 1 to 6 of the drawings, a shelter frame kit 20 adapted for mounting in front of a primary spectacle frame 10 according to a first preferred embodiment of the present invention is illustrated. The primary spectacle frame 10 comprises a frame body 11 having a pair of lens rims 151, 152 for mounting a pair of lenses 121, 122 in position wherein each lens rim 151, 152 comprises a rim locker 17, 18 for securely locking up the lens 121, 122 within the respective lens rim 151, 152. The frame body 11 comprises a primary bridge 111 connected between the two lens rims 151, 152 and two side extension arms 13, 14 provided at two outer sides of the lenses 121, 122 respectively each having a hinge portion 130, 140 rearwardly extended therefrom for pivotally coupling a temple 112, 113.

Figure 1B:
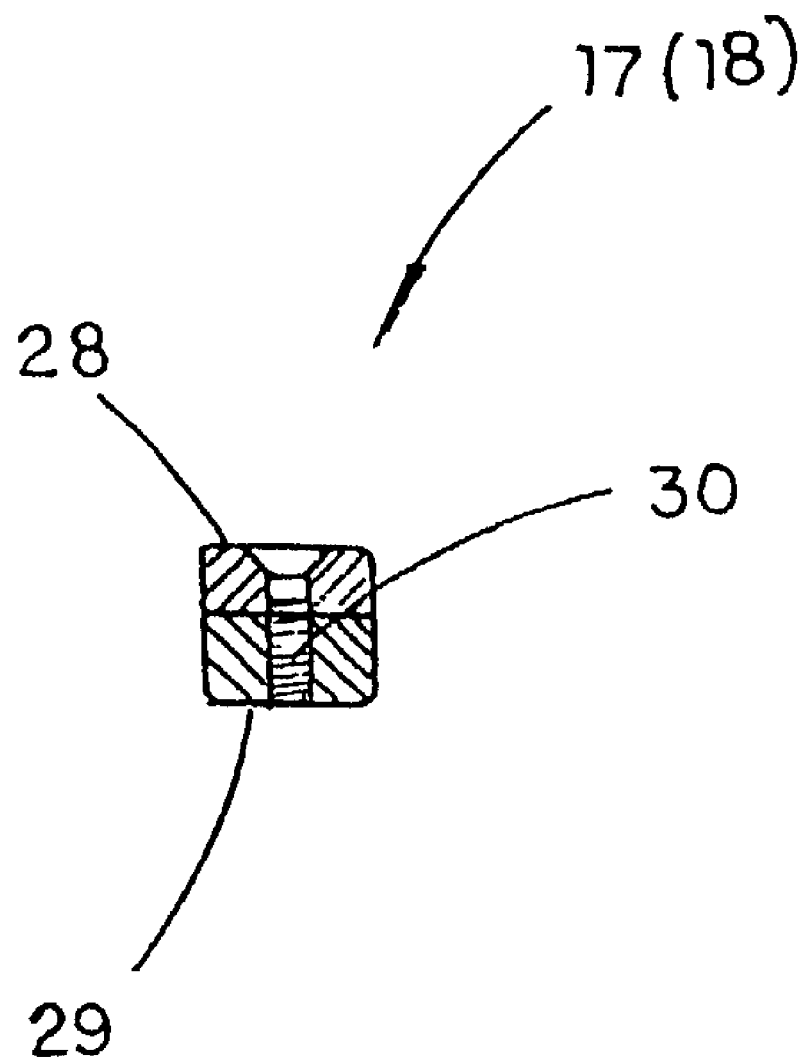
FIG. 1B is a sectional view of a rim locker of the primary spectacle frame according to the above first preferred embodiment of the present invention.
Figure 5:
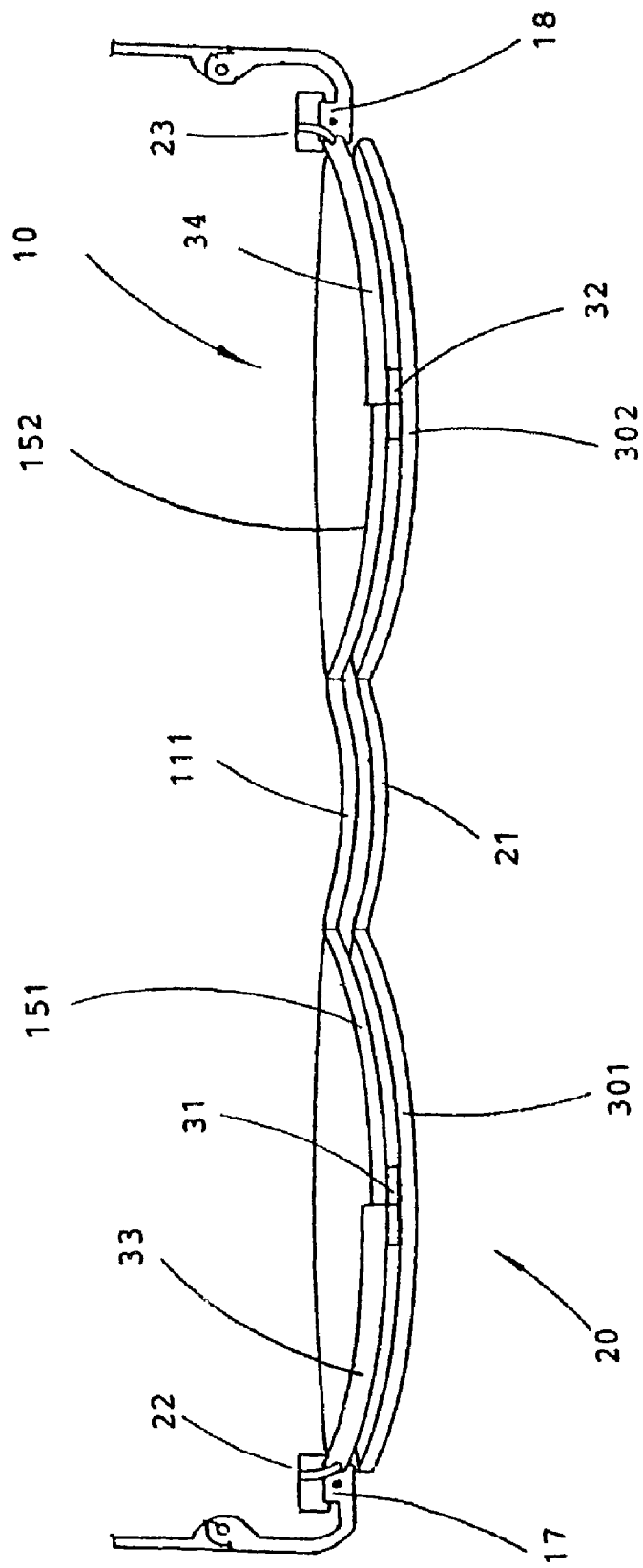
FIG. 5 is a top view of the shelter frame kit mounted in front of the primary spectacle frame according to the above first preferred embodiment of the present invention.
Figure 6:
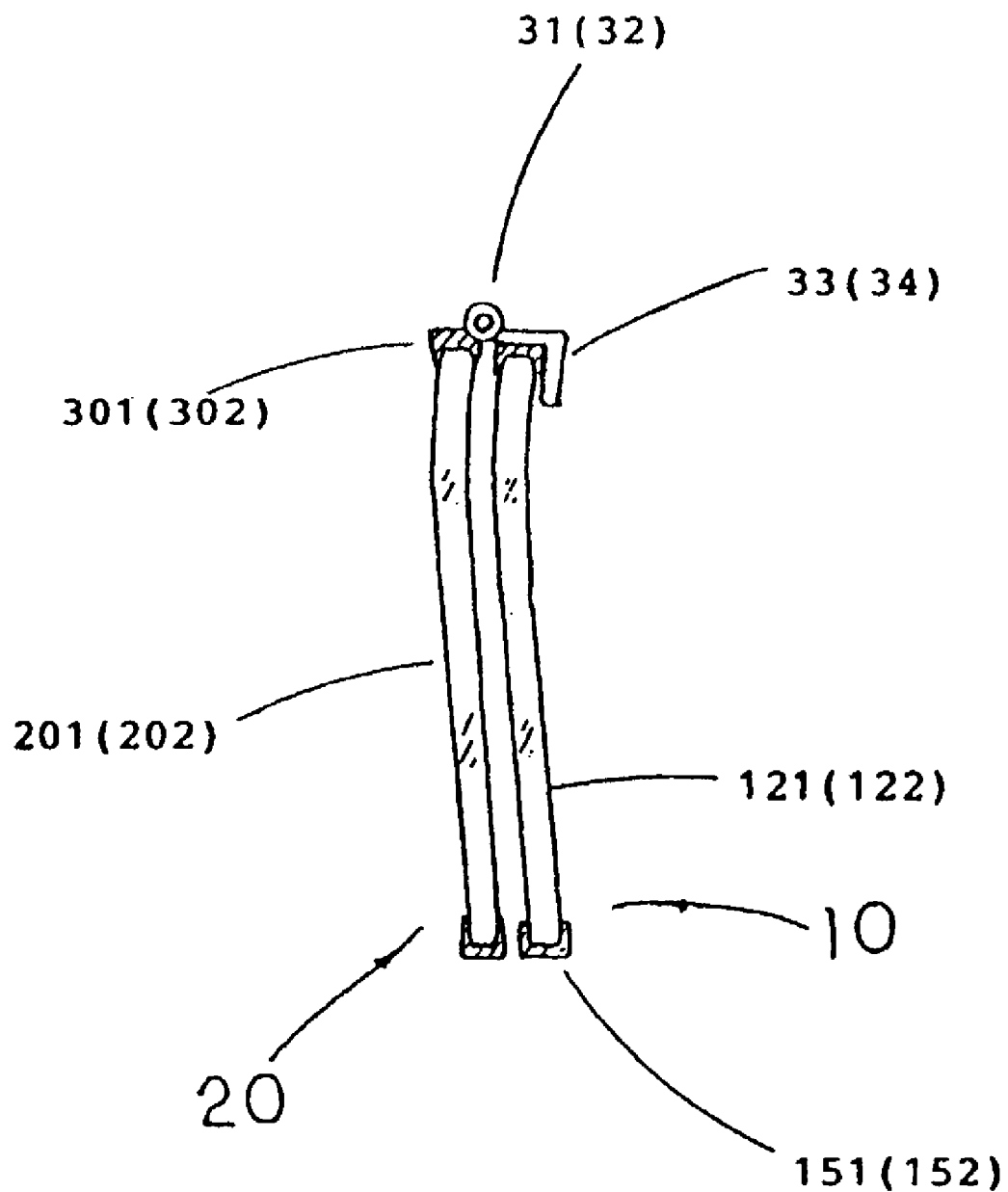
FIG. 6 is a side sectional view of the shelter frame kit mounted in front of the primary spectacle frame according to the above first preferred embodiment of the present invention.

As shown in FIGS. 1, 5, and 6, according to the first preferred embodiment of the present invention, each of the rim lockers 17, 18 is connected at the lens rim 151, 152 wherein each rim locker 17, 18 comprises a first rimlock member 28, a second rimlock member 29, and a screw 30 for securely connecting the first and second rimlock members 28, 29 together, as shown in FIG. 1B. Each rim locker 17, 18 can be shaped as different size and shape such as rectangular, square, or oval cross-sectional structure according to the size and shape of the respective lens rim 151, 152. The rim lockers 17, 18 are made of soft-magnetic metal having magnetic attraction ability such as mild steel, low carbon steel and high grade steel, which is attractive to magnetic material such as permanent magnet. Alternatively, only the screw 30 of each rim locker 17, 18 is made of soft-magnetic metal having magnetic attraction ability for magnetically attracting the magnetic material, so as to minimize the cost of the rim lockers 17, 18.

Referring to FIGS. 2, 3, 5, and 6, the shelter frame kit 20 for supporting two auxiliary lenses 201, 202 comprises a bridge 21 extended between the two auxiliary lenses 201, 202, two shelter arms 33, 34 having two pivot hinges 31, 32 affixed on upper sides of the two auxiliary lenses 201, 202 respectively, and two interlocking means 22, 23 rearwardly provided at two ends of the two shelter arms 33, 34 respectively for interlocking with the two rim lockers 17, 18 of the frame body 11 of the primary spectacle frame 10 in such a manner that the auxiliary lenses 201, 202 of the shelter frame kit 20 are adapted for pivotally folding from a closed position to an open position, wherein the closed position of the shelter frame kit 20, the two auxiliary lenses 201, 202 are respectively positioned in front of the two lenses 121, 122 of the primary spectacle frame 10, and in the opened position of the shelter frame kit 20, the two auxiliary lenses 201, 202 are 180-degree flipped over the two lenses 121, 122 of the primary spectacle frame 10 at the two pivot hinges 31, 32 respectively. The auxiliary lenses 201, 202 can be shaded lenses supported by the shelter frame kit 20 to form a detachable sunglasses.

Practically, the shelter frame kit 20 can be constructed as a shelter frame to have a pair of rims as shown in the first and second preferred embodiments or a rimless frame as shown in a third, fourth, and fifth preferred embodiments of the present invention.

Figure 4:
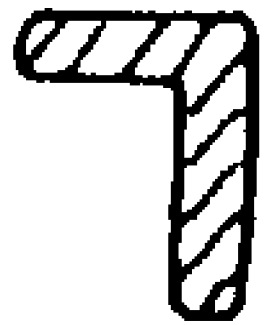
FIG. 4 is a sectional view of a shelter arm of the shelter frame kit according to the above first preferred embodiment of the present invention.

Referring to FIG. 4, each shelter arm 33, 34 having a L-shaped cross-sectional structure is partially encircling the respective auxiliary lens 201, 202 wherein the shelter arm 33, 34 is adapted for riding on and locking from behind of the respective lens rim 151, 152 of the frame body 11, as shown in FIG. 6, so as to lock up the shelter frame kit 20 on the primary spectacle frame 11 for preventing a frontward movement and a backward movement of the shelter frame kit 20.

Figure 2:
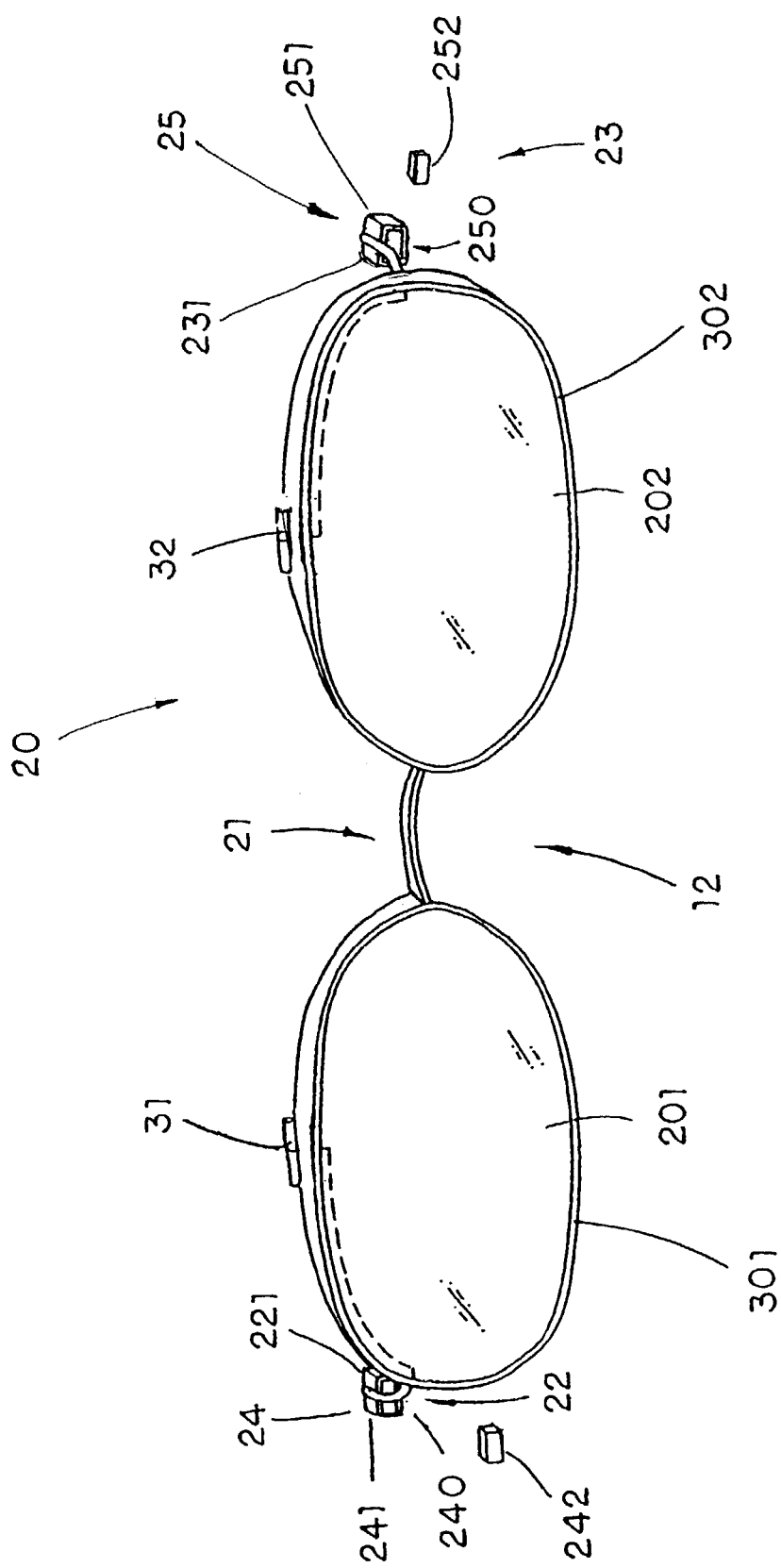
FIG. 2 is a perspective view of a shelter frame kit according to the above first preferred embodiment of the present invention.
Figure 3:
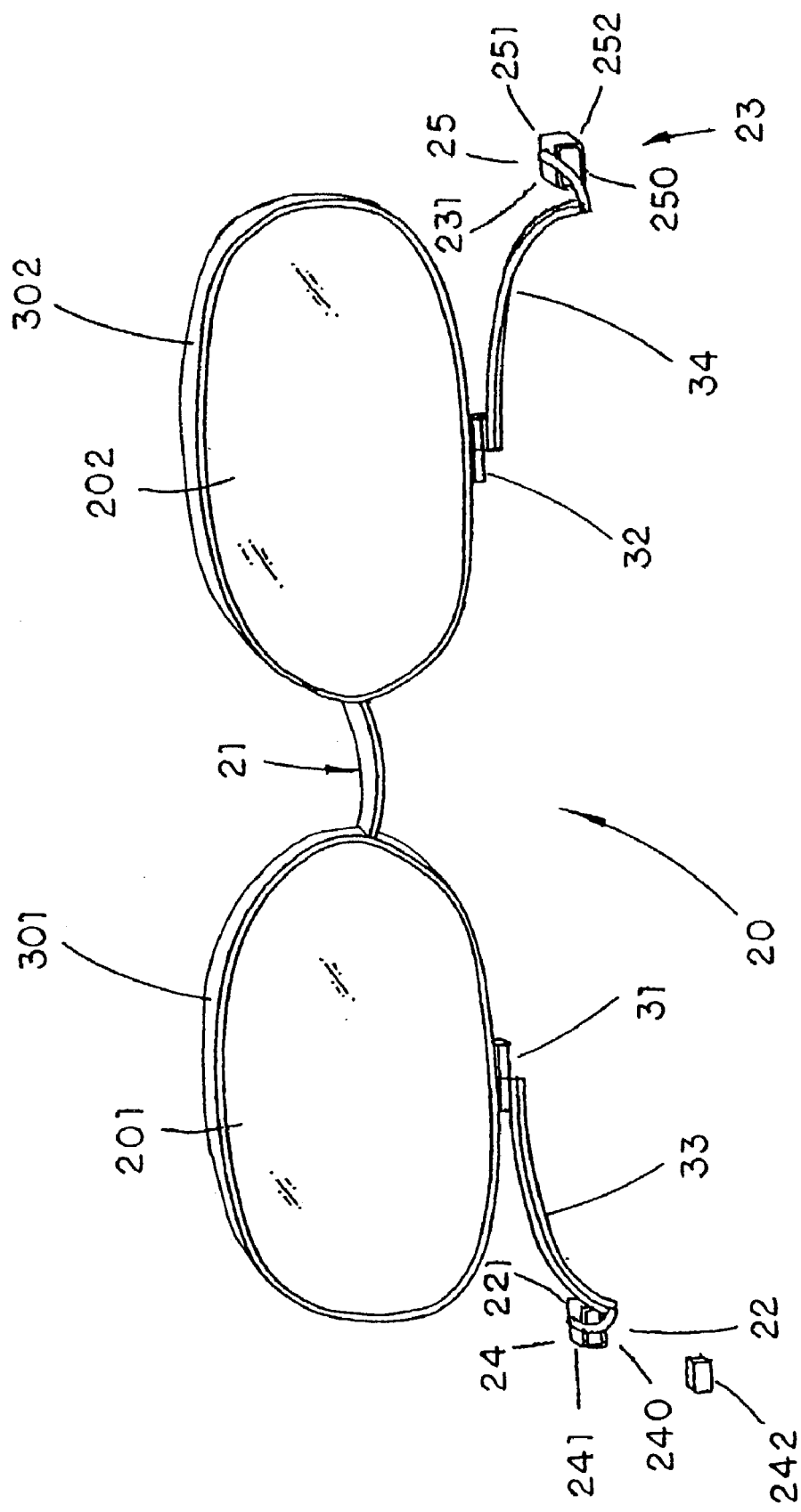
FIG. 3 is a perspective view of the shelter frame kit in an opened position according to the above first preferred embodiment of the present invention.

Each shelter arm 33, 34 is integrally extended from the upper portion of the respective auxiliary lens 201, 202 to the outer side thereof wherein the shelter arm 33, 34 has an end pivotally connected with the upper side of the respective lens rim 151, 152 by means of the pivot hinge 31, 32 and another end of the shelter arm 33, 34 is permanently affixed to the respective interlocking means 22, 23 in such a manner that the two auxiliary lenses 201, 202 are pivotally rotated upwardly and downwardly at the two pivot hinges 31, 32 respectively in order to fold and unfold the shelter frame kit 20 in the open position, as shown in FIG. 2, and the closed position, as shown in FIG. 3.

Each of the interlocking means 22, 23 comprises a supporting arm 221, 231 rearwardly extended for riding on top of the respective side extension arm 13, 14 of the frame body 11 of the primary spectacle frame 10, and a magnetic seat 24, 25 downwardly connected from the supporting arm 221, 231 for magnetically attracting from behind the respective side extension arm 13, 14 and engaging with the respective rim locker 17, 18 so as to securely mount the shelter frame kit 20 in front of the primary spectacle frame 10.

Each of the magnetic seat 24, 25 comprises a magnetic housing 241, 251, which is made of non-magnetic material or soft-magnetic metal having magnetic attraction ability such as mild steel, low carbon steel and high grade steel, downwardly connected from the respective supporting arm 221, 231 and a magnet 242, 252 mounted in the magnet housing 241, 251 which is arranged to face toward and align with the respective rim locker 17, 18 of the respective lens rim 151, 152 when the shelter frame kit 20 is mounted on the frame body 11 of the primary spectacle frame 10.

Accordingly, the thickness of the two magnets 242, 252 are respectively smaller than the depth of the two magnet housing 241, 251 so as to define two engagement grooves 240, 250 when the two magnets 242, 252 are respectively embedded in the two magnet housing 241, 251 for engaging with the two rim lockers 17, 18 of the frame body 11 of the primary spectacle 10. Thus, the two indented engagement grooves 240, 250 of the magnet housing 241, 251 have a corresponding size and shape of the two rim lockers 17, 18 respectively so that the two rim lockers 17, 18 can be fittedly engaged into the two engagement grooves 240, 250 when the shelter frame kit 20 is mounted on the primary spectacle frame 10 as shown in FIG. 5, so as to further interlock the shelter frame kit 20 with the primary spectacle frame 10 by preventing any upward, downward, leftward, and rightward movement of the shelter frame kit 20.

As shown in FIG. 5, when the two supporting arms 221, 231 ride on the two side extension arms 13, 14 respectively, the two magnetic seats 24, 25 will attract from behind with the two rim lockers 17, 18 of the frame body 11 of the primary spectacle frame 10 respectively until the two rim lockers 17, 18 are inserted into the engagement grooves 240, 250 respectively, so as to firmly engage the shelter frame kit 20 with the primary spectacle frame 10 in an interlocking manner.

In order to mount the shelter frame kit 20 in front of the frame body 11 of the primary spectacle frame 10, the user may simply use one hand to put the shelter frame kit 20 in front of the primary spectacle frame 10 and drop it down. Due to the magnetic attraction, the two magnetic seats 24, 25 of the shelter frame kit 20 are magnetically attracted from behind to engage with the two rim lockers 17, 18 of the frame body 11 of the primary spectacle frame 10 respectively. Moreover, the two rim lockers 17, 18 can further guide the two magnetic seats 24, 25 to automatically align and attract with the two engagement grooves 240, 250 thereof respectively. Thus, the two interlocking means 22, 23 of the shelter frame kit 20 are respectively interlocked with two side extension arms 13, 14 of the frame body 11. So, the present invention provides not only the magnetic attraction but also the interlocking engagement for securely mounting the shelter frame kit 20 on the primary spectacle frame 10.

Figure 7:
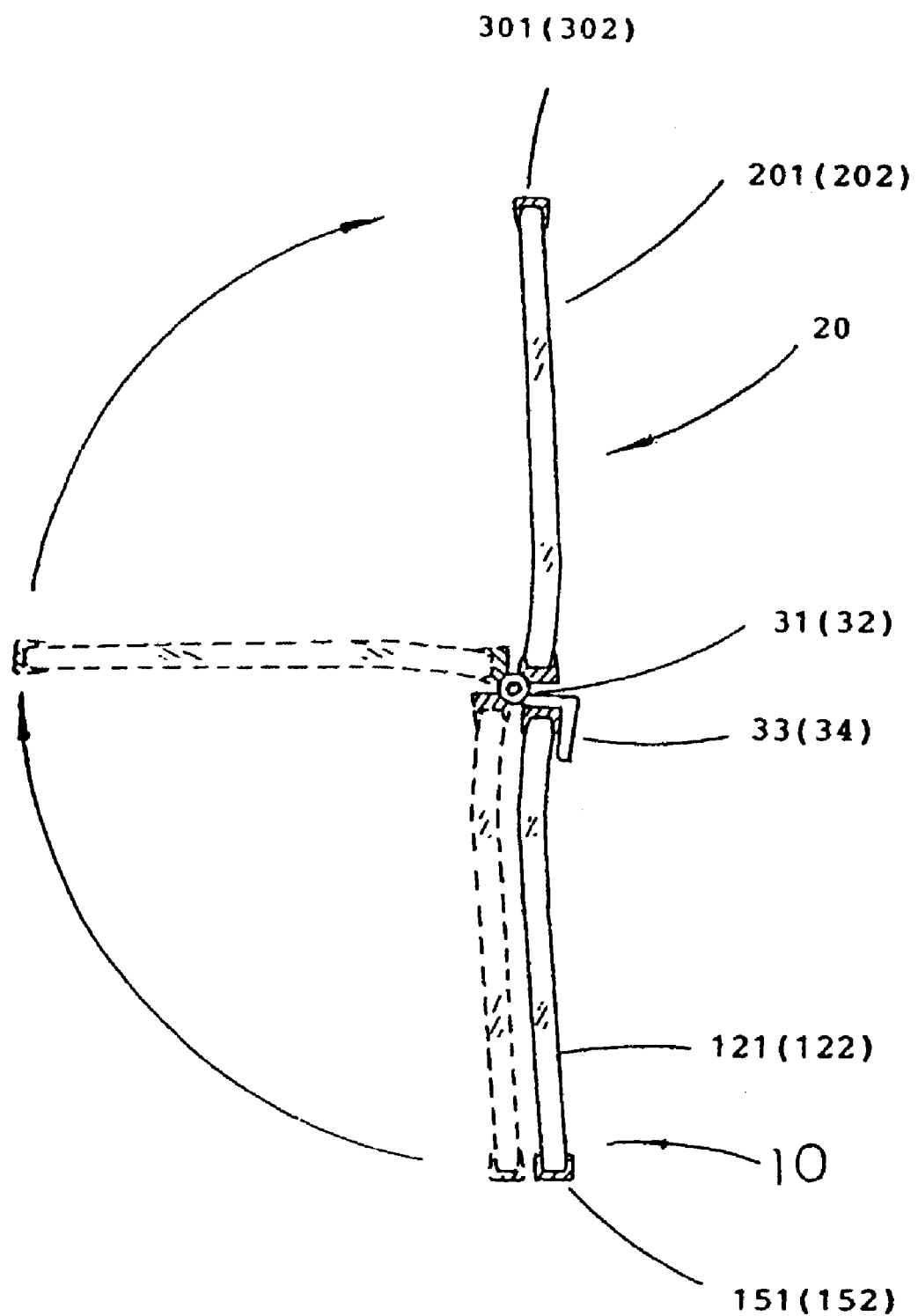
FIG. 7 is a side sectional view of the shelter frame kit mounted in front of the primary spectacle frame in an opening position according to the above first preferred embodiment of the present invention.

When the shelter frame kit 20 is mounted in front of the primary spectacle frame 10, the two shelter arms 33, 34 are respectively riding on top of the two lenses 121, 122 and locked the lens rimes 151, 152 of the primary spectacle frame 10 from behind, as shown in FIG. 6. The two auxiliary lenses 201, 202 are adapted for upwardly folding from the closed position to the open position, as shown in FIG. 7. So, for example, a driver is able to quickly and conveniently fold the auxiliary lenses 201, 202 upward, when entering a channel which is dim, and unfold the auxiliary lenses 201, 202 back when existing the channel, which is shining his or her eyes.

According to the present invention, the user can also detach the shelter frame kit 20 from the primary spectacle frame 10 easily by slightly pushing the shelter frame kit 20 towards the primary spectacle frame 10 until the two magnetic seats 24, 25 of the two interlocking means 22, 23 move rearwardly apart from the two rim lockers 17, 18, so that the magnetic attraction and mechanical engagement between the shelter frame kit 20 and the primary spectacle frame 10 are released at the same time, and then the user may detach the shelter frame kit 20 by simply lifting it up from the primary spectacle frame 10 with one hand.

Figure 8:
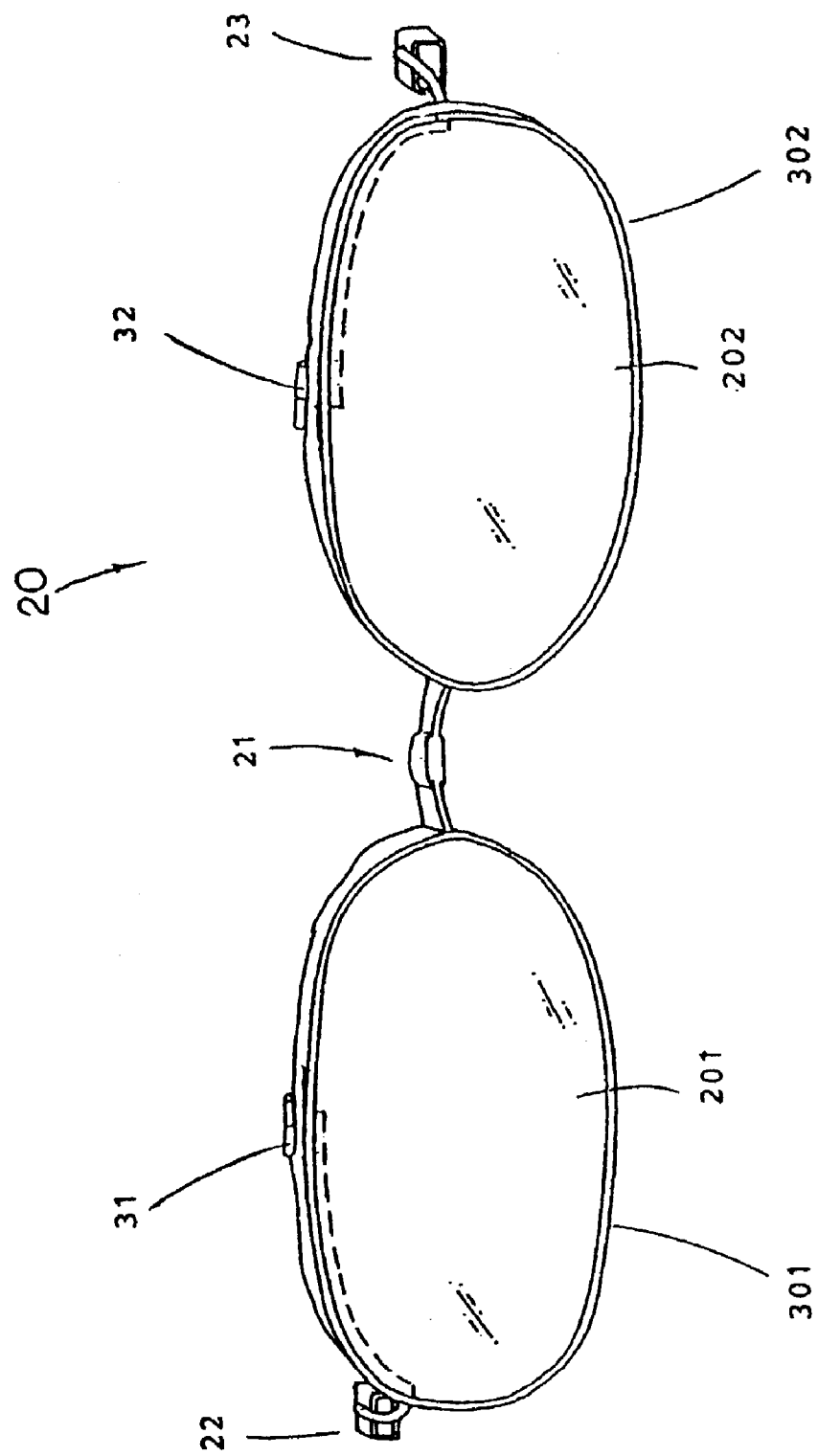
FIG. 8 is a front perspective view of the shelter frame kit incorporated with a bridge lock according to the above first preferred embodiment of the present invention.
Figure 9:
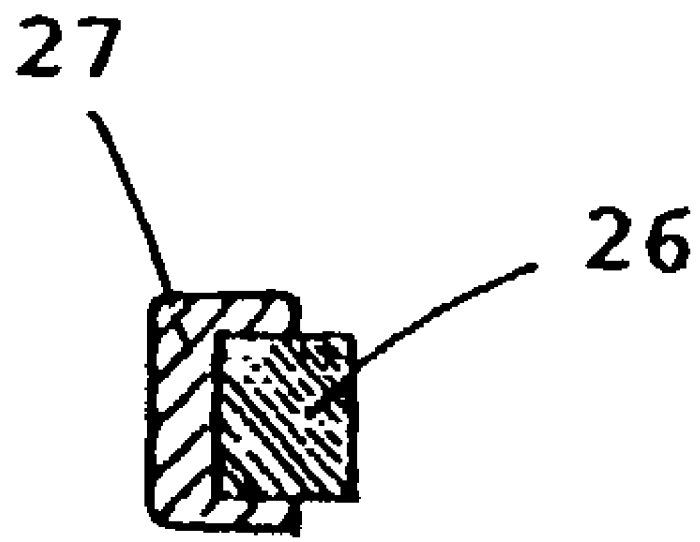
FIG. 9 is a sectional view of the bridge lock of the shelter frame kit according to the above first preferred embodiment of the present invention.
Figure 10:
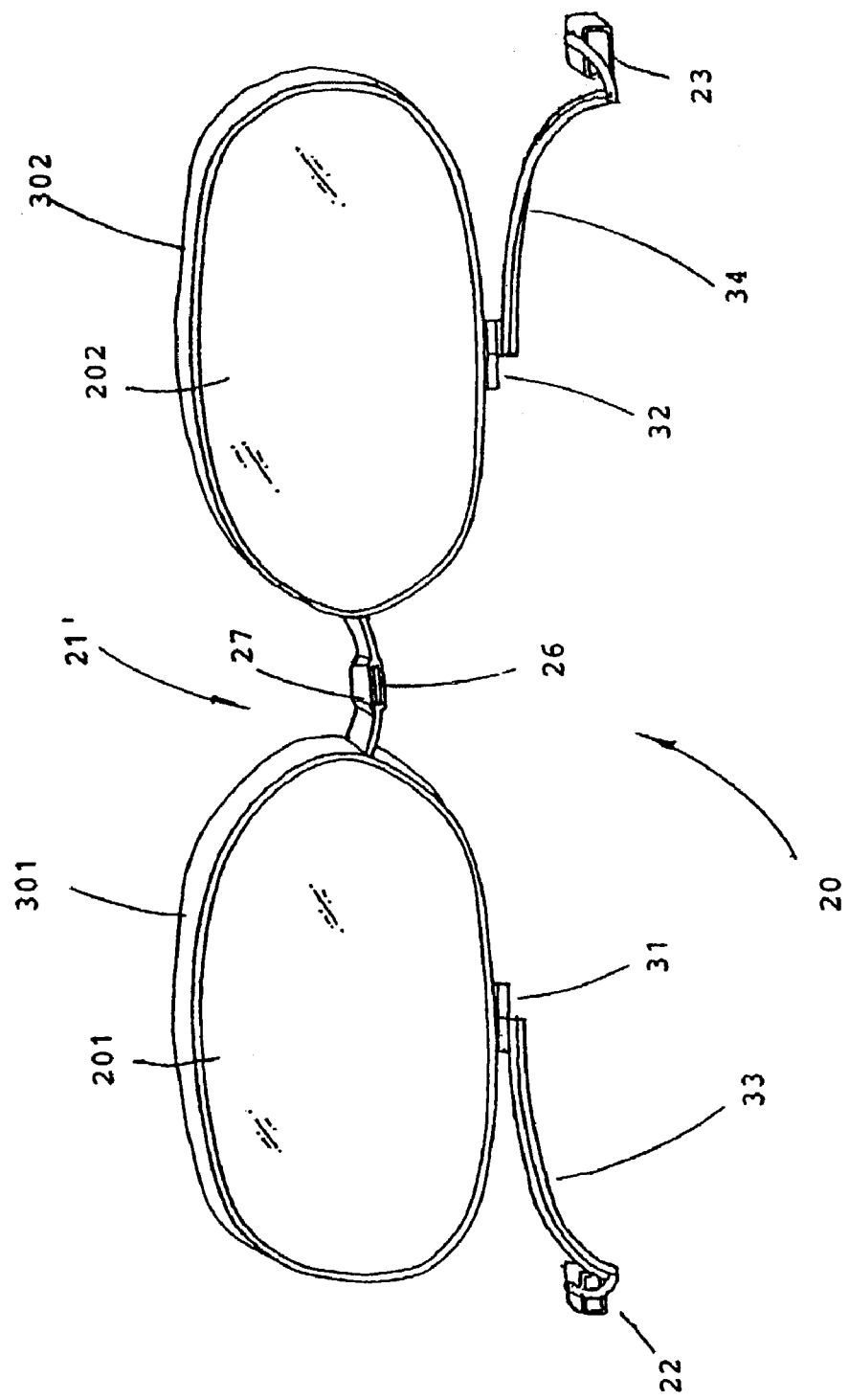
FIG. 10 is a front perspective view of the shelter frame kit with the bridge lock in an opened position according to the above first preferred embodiment of the present invention.
Figure 11:
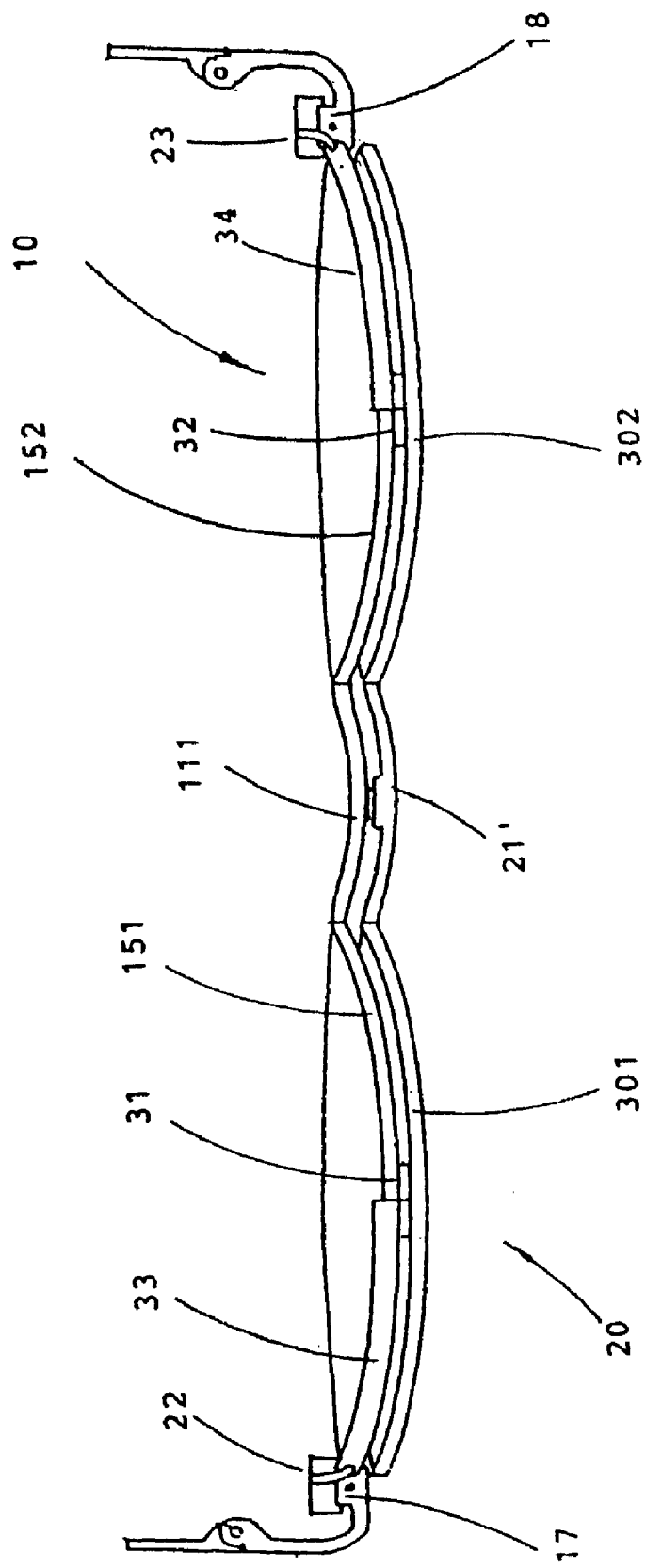
FIG. 11 is a top view of the shelter frame kit with the bridge lock mounted in front of the primary spectacle frame according to the above first preferred embodiment of the present invention.
Figure 14:
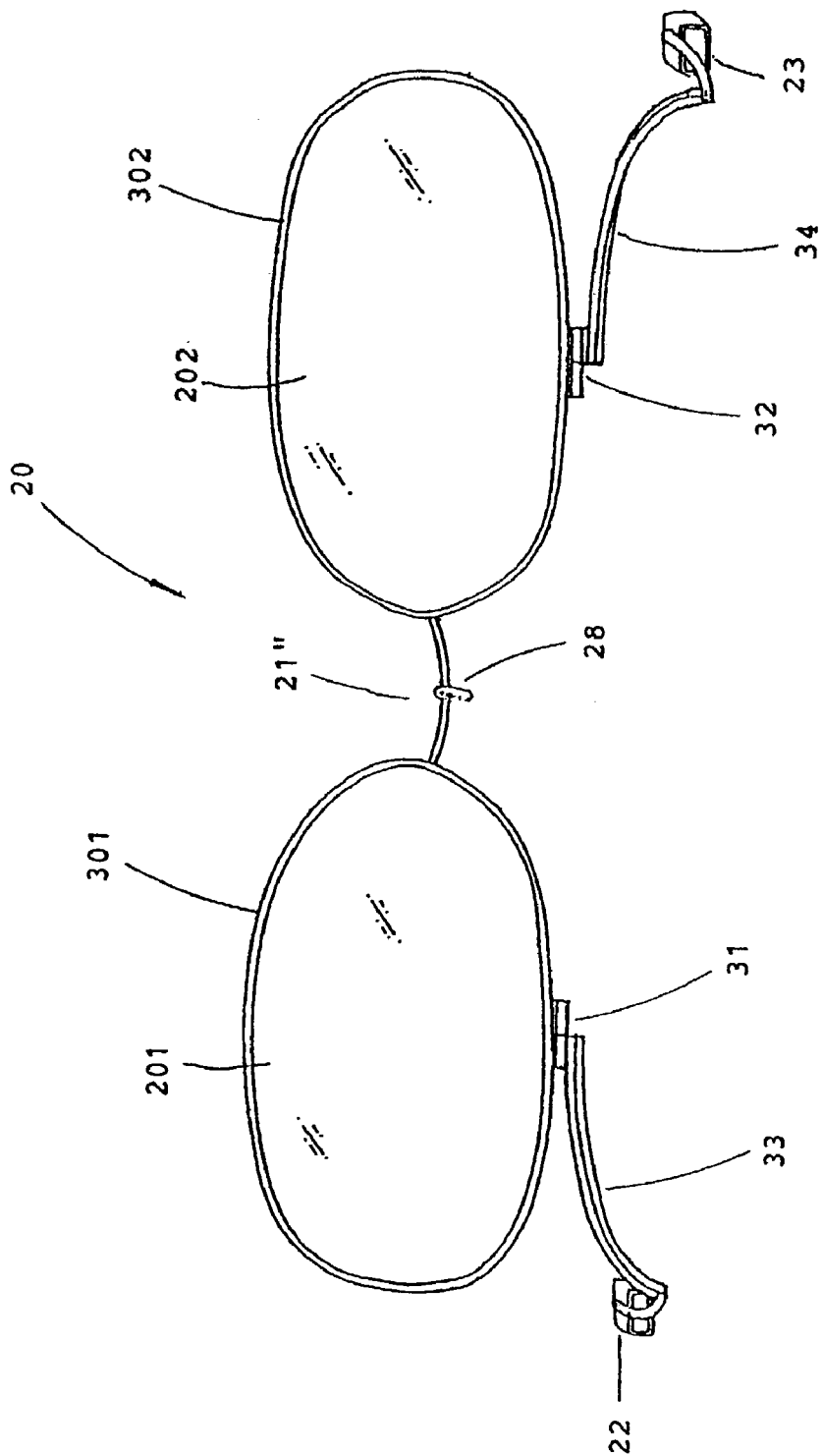
FIG. 14 is a front perspective view of the shelter frame kit in the opened position according to the above first preferred embodiment of the present invention.
Figure 15:
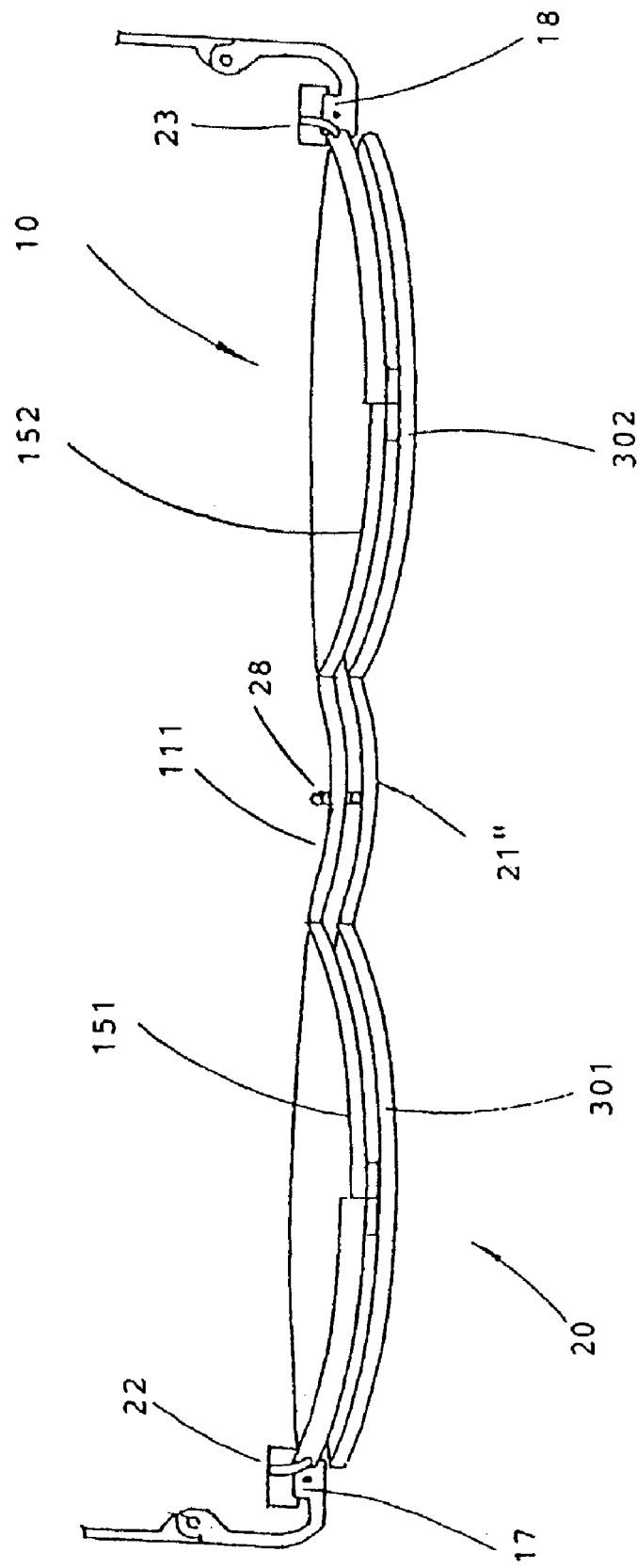
FIG. 15 is a top view of the shelter frame kit mounted in front of the primary frame according to the above first preferred embodiment of the present invention.

Referring to FIGS. 8 to 10, in order to further securely mount the shelter frame kit 20 in front of the primary spectacle frame 10, the shelter frame kit 20 further comprises a bridge lock 21' for holding the auxiliary lenses 201, 202 in the closed position, wherein the bridge lock 21' comprises a magnet holder 27 mounted on a mid-portion of the bridge 21 of the shelter frame kit 20 and a bridge magnet 26 embedded on the magnet holder 27, which is arranged to face toward and align with the primary bridge 111 of the primary spectacle frame 10 when the shelter frame kit 20 is mounted in front of the primary spectacle frame 10. The thickness of the bridge magnet 26 is larger than the depth of the magnet holder 27 so that a pole end of the bridge magnet 26 is rearwardly protruded from the magnet holder 27. Accordingly, the primary bridge 111 of the primary spectacle frame 10 can made of soft-magnetic metal having magnetic attraction ability such that when the shelter frame kit 20 is mounted in front of the primary spectacle frame 10, the protruded pole of the bridge magnet 26 is magnetically attracted with the primary bridge 111 of the primary spectacle frame 10, as shown in FIG. 11, for not only securely holding the two auxiliary lenses 201, 202 in the closed position but also preventing a backward movement of the shelter frame kit 20. So, the shelter frame kit 20 can be locked in front of the primary spectacle frame 10 in all directions.

Alternatively, the bridge lock 21" comprises a bridge hook 28 formed on the mid-portion of the bridge 21 wherein the bridge hook 28 is adapted for hooking at a back of the primary bridge 111 when the shelter frame kit 20 is mounted on the primary spectacle frame 10, as shown in FIGS. 12 to 15.

Figure 16:
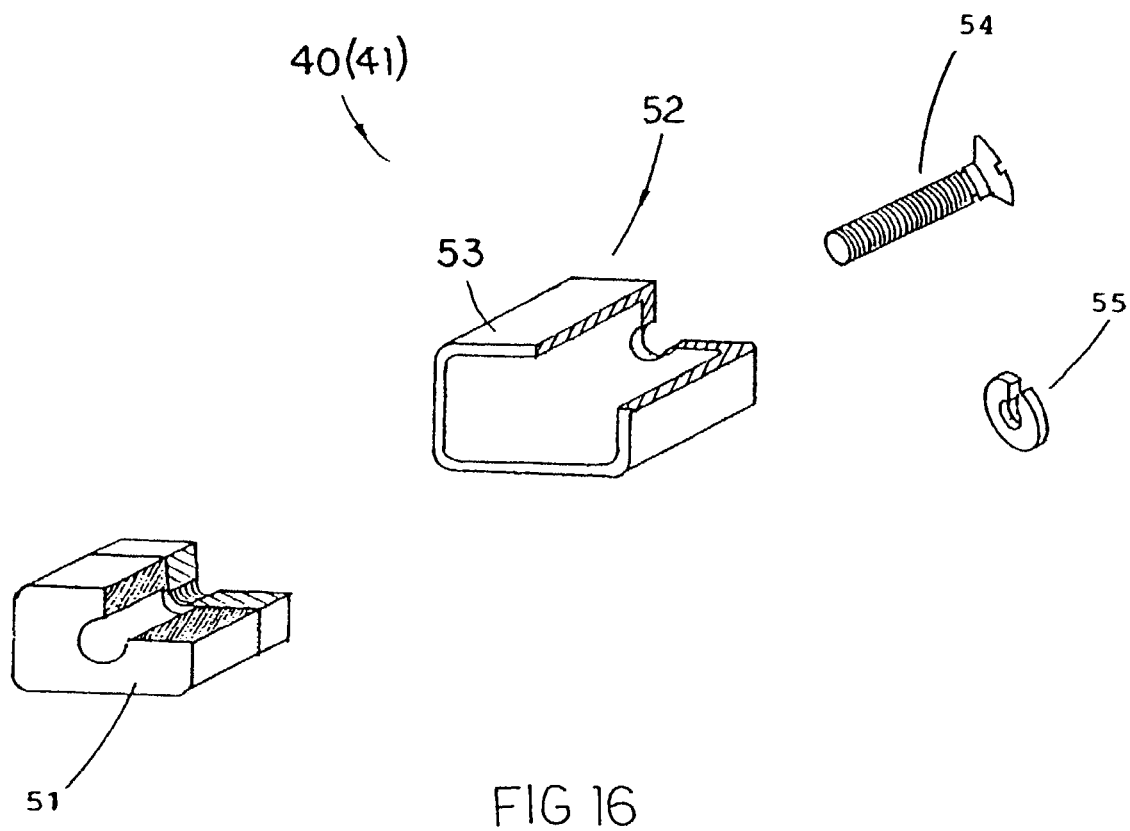
FIG. 16 is an exploded perspective view of an adjustable interlocking means of the shelter frame kit according to the above first preferred embodiment of the present invention.
Figure 17:
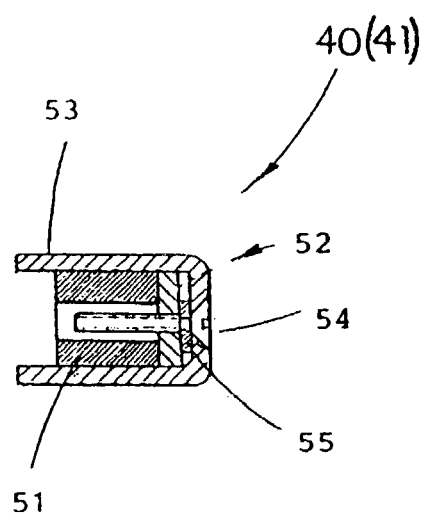
FIG. 17 is a partially sectional view of the adjustable interlocking means of the shelter frame kit according to the above first preferred embodiment of the present invention.

Accordingly, the interlocking means 22, 23 can be modified to an adjustable interlocking means 40, 41 in order to minimize a gap between the shelter frame kit 20 and the primary spectacle frame 10. As shown in FIGS. 16 and 17, each adjustable interlocking means 40, 41 comprises an adjustable magnetic seat 52 having an adjustable magnetic housing 53, which is made of non-magnetic material or soft-magnetic metal having magnetic attraction ability such as mild steel, low carbon steel and high grade steel, and an adjustable magnet 51 mounted in the adjustable magnet housing 53 which is arranged to face toward and align with the respective rim locker 17, 18 of the respective lens rim 151, 152 when the shelter frame kit 20 is mounted on the frame body 11 of the primary spectacle frame 10. The adjustable interlocking means 40, 41 further comprises a locking washer 55 disposed in the adjustable magnet housing 53 and an adjusting screw 54 horizontally penetrated through the adjustable magnetic seat 52 and communicated with the adjustable magnet 51 for adjusting the depth of the engagement grooves 241, 252.

The adjustable magnet 51 has a hole having an inner threaded portion provided at a rear pole of the adjustable magnet 51 wherein the adjustable screw 54 having an outer threaded portion is penetrated through the adjustable magnetic seat 52 at a back thereof through the locking washer 55 and screwing with the adjustable magnet 51. The adjustable screw 54 is arranged to drive the adjustable magnet 51 back and forth along the adjustable magnet housing 53 so as to adjust the depth of the engagement groove 240, 250. When the adjustable screw 54 is rotated in one direction, the adjustable magnet 51 is driven to slidably move frontward along the adjustable magnet housing 53, so as to decrease the depth of the respective engaging groove 240, 250.

When the adjustable screw 54 is rotated in an opposite direction, the adjustable magnet 51 is driven to slidably move rearward along the adjustable housing 53, so as to increase the depth of the respective engaging groove 240, 250. So, when the two rim lockers 17, 18 are respectively engaged with the two engagement grooves 240, 250 having less depth, the gap between the shelter frame kit 20 and the primary spectacle frame 10 will be decreased. Otherwise, the gap between the shelter frame kit 20 and the primary spectacle frame 10 will be increased when the depth of the engagement grooves 240, 250 is increased.

Figure 18:
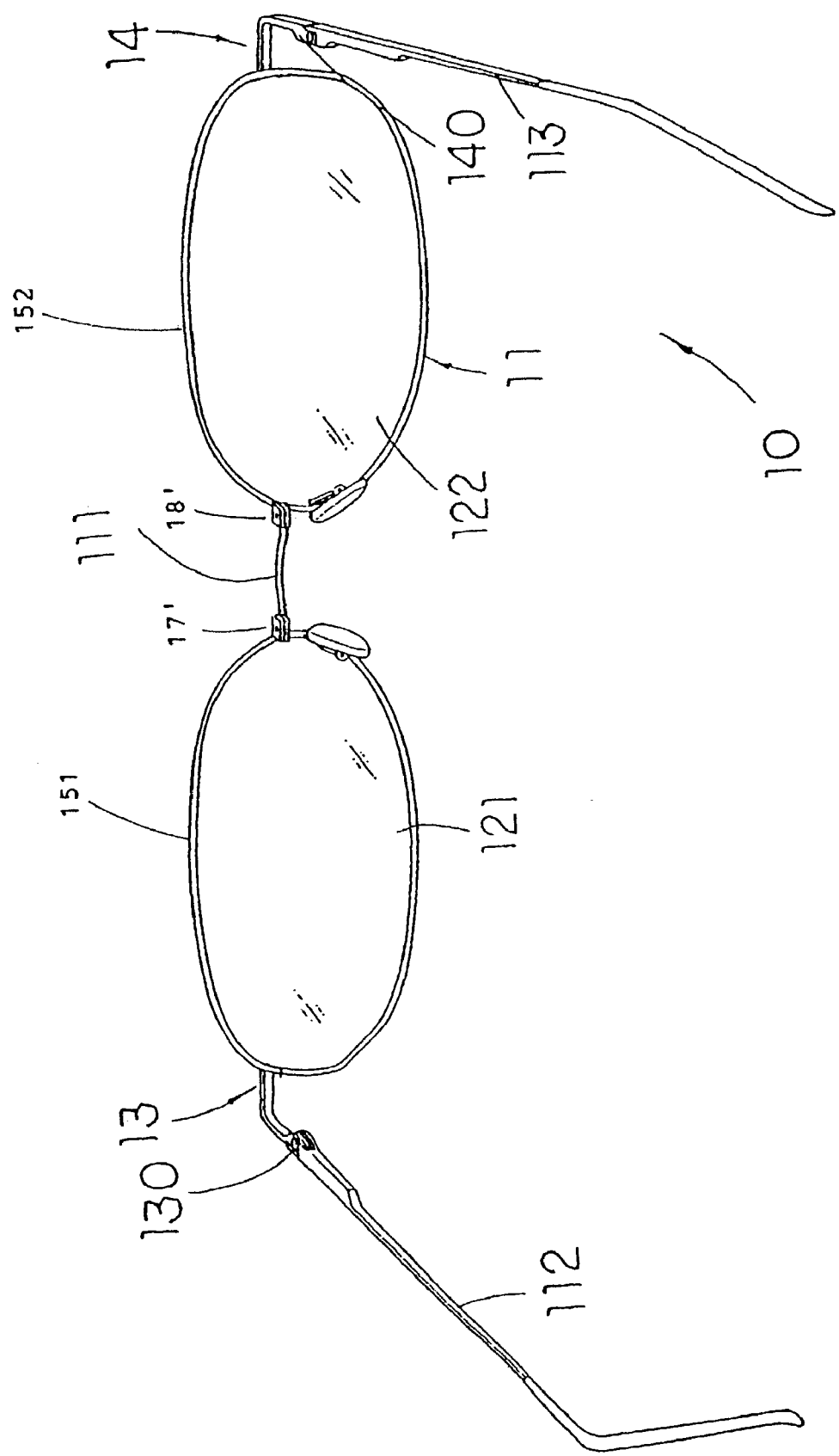
FIG. 18 is a rear perspective view of a primary spectacle frame according to a second preferred embodiment of the present invention.
Figure 19:
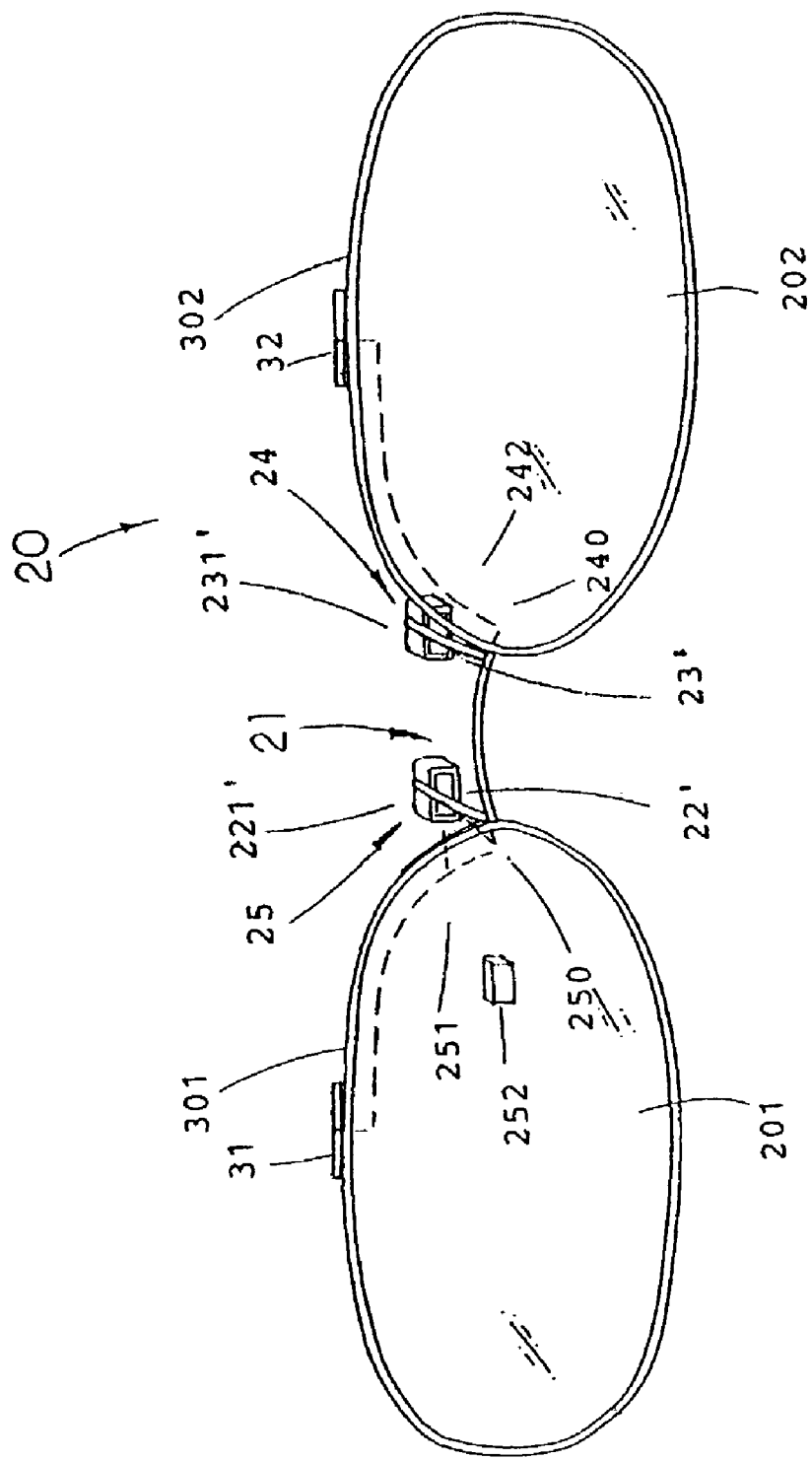
FIG. 19 is a front perspective view of a shelter frame kit according to the above second preferred embodiment of the present invention.
Figure 20:
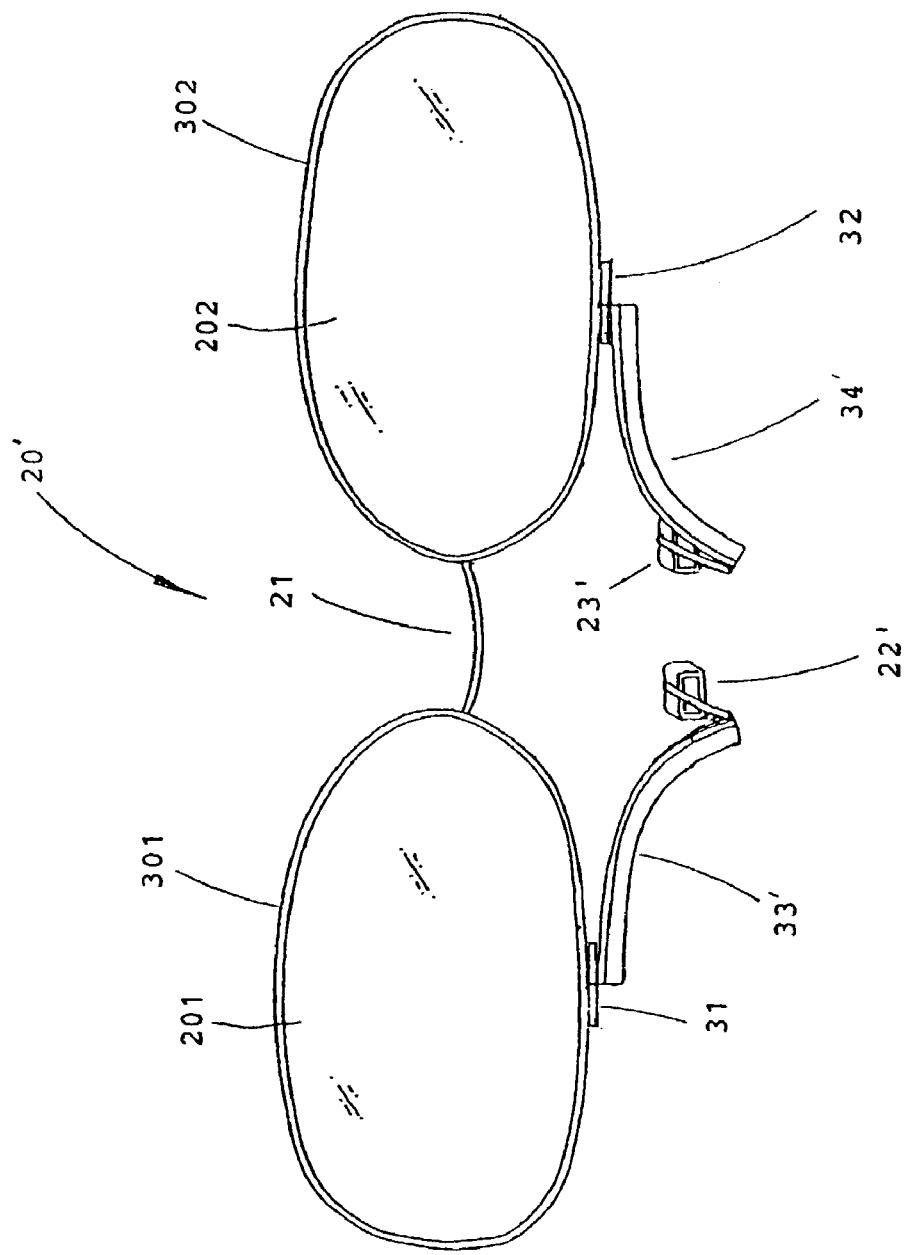
FIG. 20 is a front perspective view of the shelter frame kit in an opened position according to the above second preferred embodiment of the present invention.

Referring to FIGS. 18 to 21 of the drawings, a primary spectacle frame 10' and a magnetic shelter frame 20' according to a second preferred embodiment of the present invention are illustrated, wherein the attraction and engagement concepts of the second embodiment is the same as the above first embodiment. The modification in the second embodiment includes the location of the rim lockers 17', 18' of the frame body 11'. Accordingly, the two rim lockers 17', 18' are respectively mounted on two inner sides of the two lens rims 151, 152, which are two ends of the primary bridge 111 respectively, as shown in FIG. 18.

Figure 21:
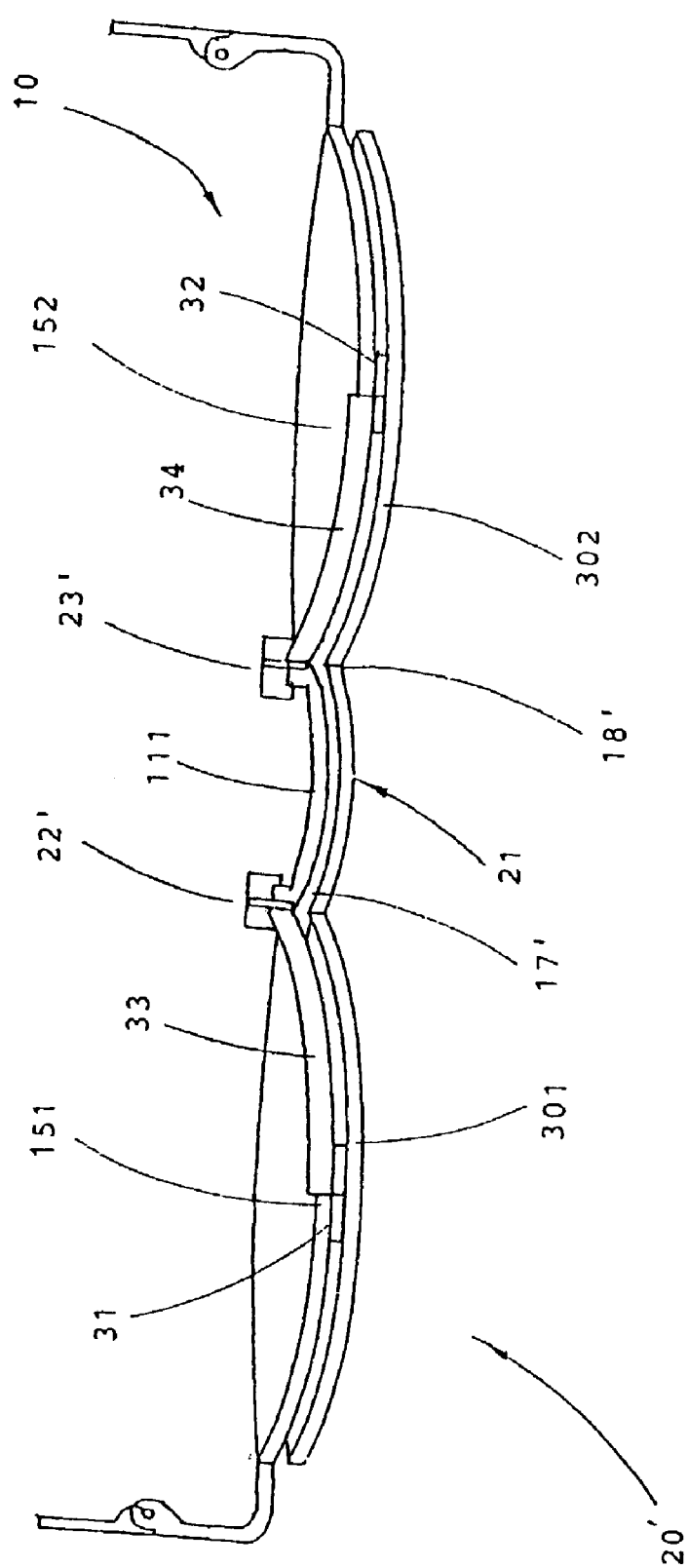
FIG. 21 is a top view of the shelter frame kit mounted in front of the primary spectacle frame according to the above second preferred embodiment of the present invention.

Each shelter arm 33', 34' is integrally extended from the upper portion of respective auxiliary lens 201, 202, which are mounted on rims 301, 302 respectively, to the inner side thereof wherein the two interlocking means 22', 23' are provided at two inner ends of the shelter arm 33', 34' respectively, which are two ends of the bridge 21 of the shelter frame 20', for riding on top of the primary bridge 111 and magnetically attracting from behind the primary bridge 111 and engaging with the rim lockers 17', 18' respectively, so as to securely interlock with the primary bridge 111 of the primary spectacle frame 10', as shown in FIG. 21.

Figure 22:
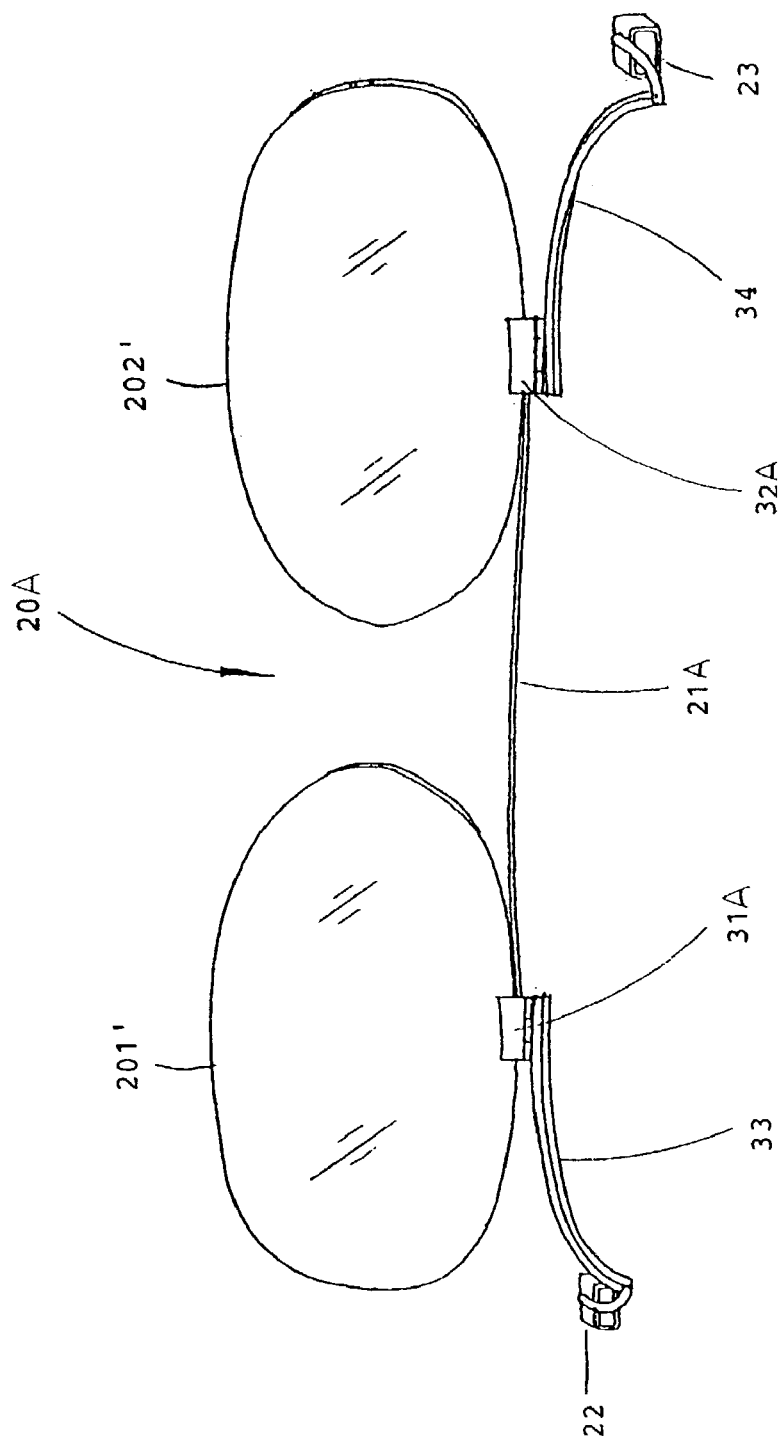
FIG. 22 is a front perspective view of a shelter frame kit in an opened position according to a third preferred embodiment of the present invention.

As it is mentioned above, the shelter frame kit 20 can be constructed as a rimless frame as shown in the third, fourth, and fifth embodiments of the present invention. Referring to FIG. 22, a shelter frame kit 20A according to the third preferred embodiment of the present invention is illustrated, wherein the shelter frame kit 20A constructed as a rimless frame is adapted for mounting in front of the primary spectacle frame 10 in the first embodiment which has two rim lockers 17, 18 provided at two outer sides of the lens 121, 122.

The major difference of the shelter frame kit 20A of the third embodiment and the first embodiment is the bridge 21A is connected between the two pivot hinges 31A, 32A wherein the two pivot hinges 31A, 32A are directly fastened to the upper edges of the two auxiliary lenses 201, 202 respectively.

Figure 23:
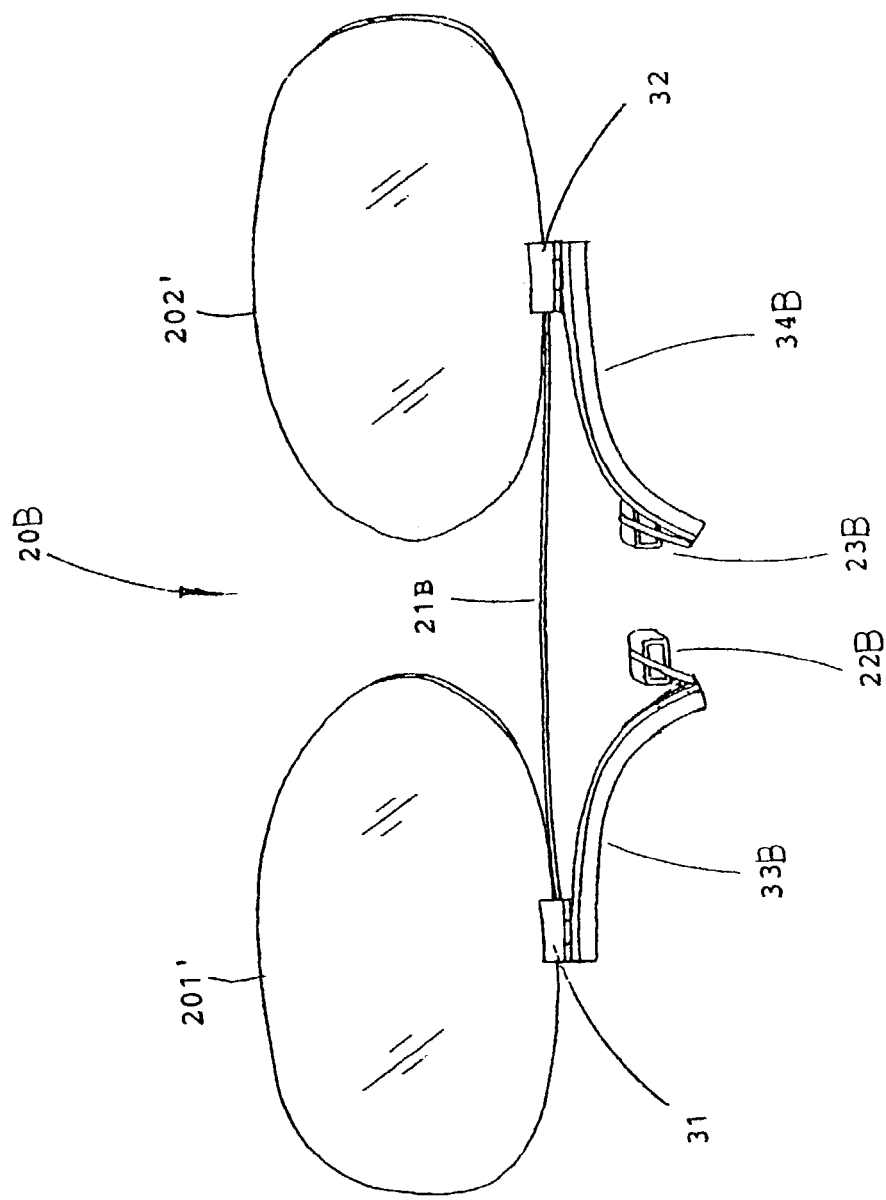
FIG. 23 is a front perspective view of a shelter frame kit in an opened position according to a fourth preferred embodiment of the present invention.

Alternatively, for the primary spectacle frame 10 of the second embodiment, which has two rim lockers 17, 18 provided on the two inner sides of the two lenses 121, 122 respectively, the two shelter arms 33B, 34B are integrally extended to the inner sides of the two auxiliary lenses 201, 202, as shown in FIG. 23, wherein the two interlocking means 22B, 23B are rearwardly extended for riding on the primary bridge 111 of the primary spectacle frame 10.

Figure 24:
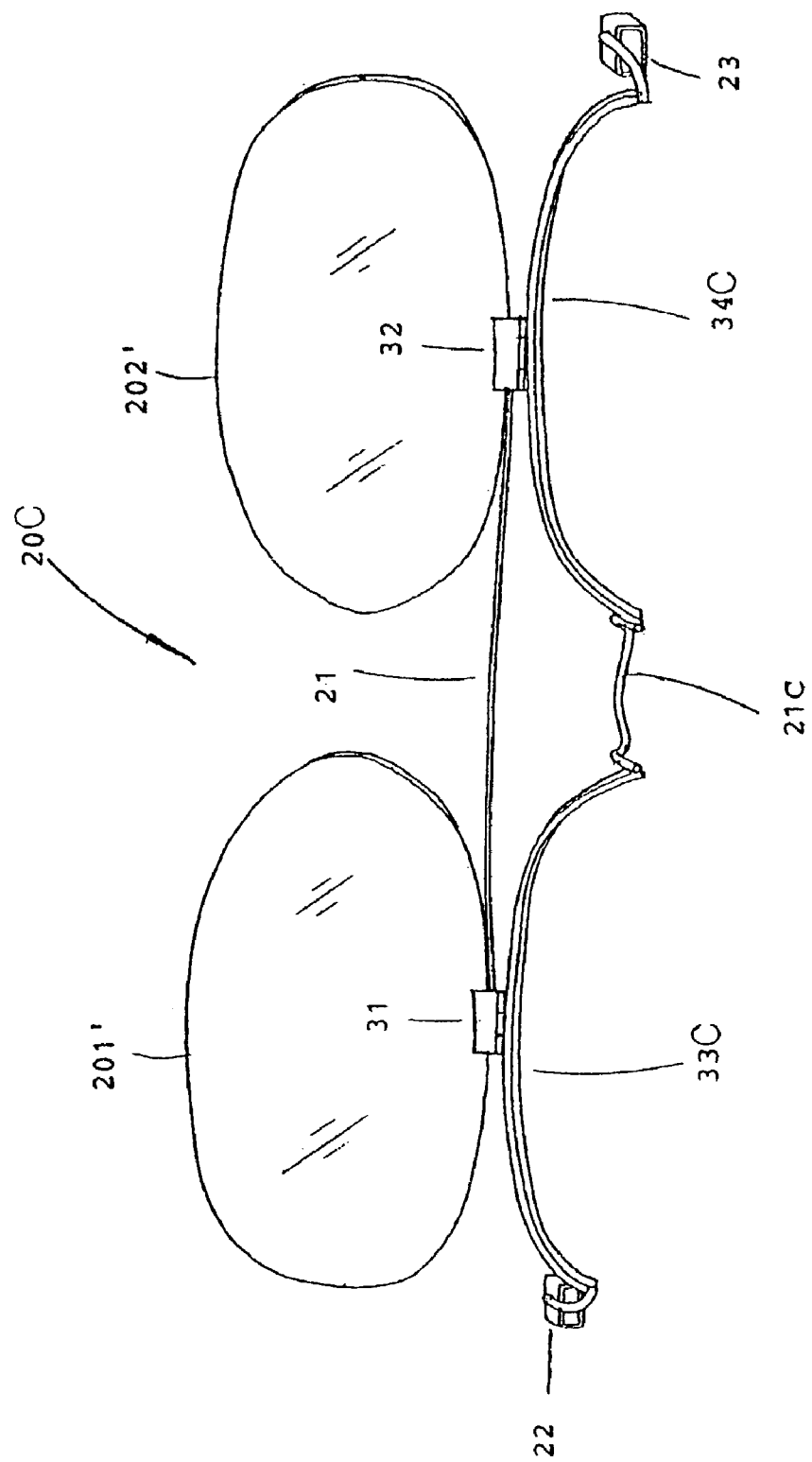
FIG. 24 is a front perspective view of a shelter frame kit in an opened position according to a fifth preferred embodiment of the present invention.

Referring to FIG. 24, a shelter frame kit 20C according to the fifth embodiment of the present invention is illustrated, wherein the shelter frame kit 20 basically is a further modification of the third embodiment for further securely mounting in front of the primary spectacle frame 10, especially when the wearer is during sporting or doing exercise.

Accordingly, the two shelter arms 33C, 34C are further integrally extended to the two inner sides of the two auxiliary lenses 201, 202 respectively wherein an U-shaped clip-bridge 21C for clipping on the primary bridge mounted between two inner ends of the two shelter arms 33C, 34C respectively, so as to further interlock the shelter frame kit 20C in front of the primary spectacle frame 10 by preventing any upward, downward, leftward, rightward, frontward, and backward movement of the shelter frame kit 20C.

Figure 25:
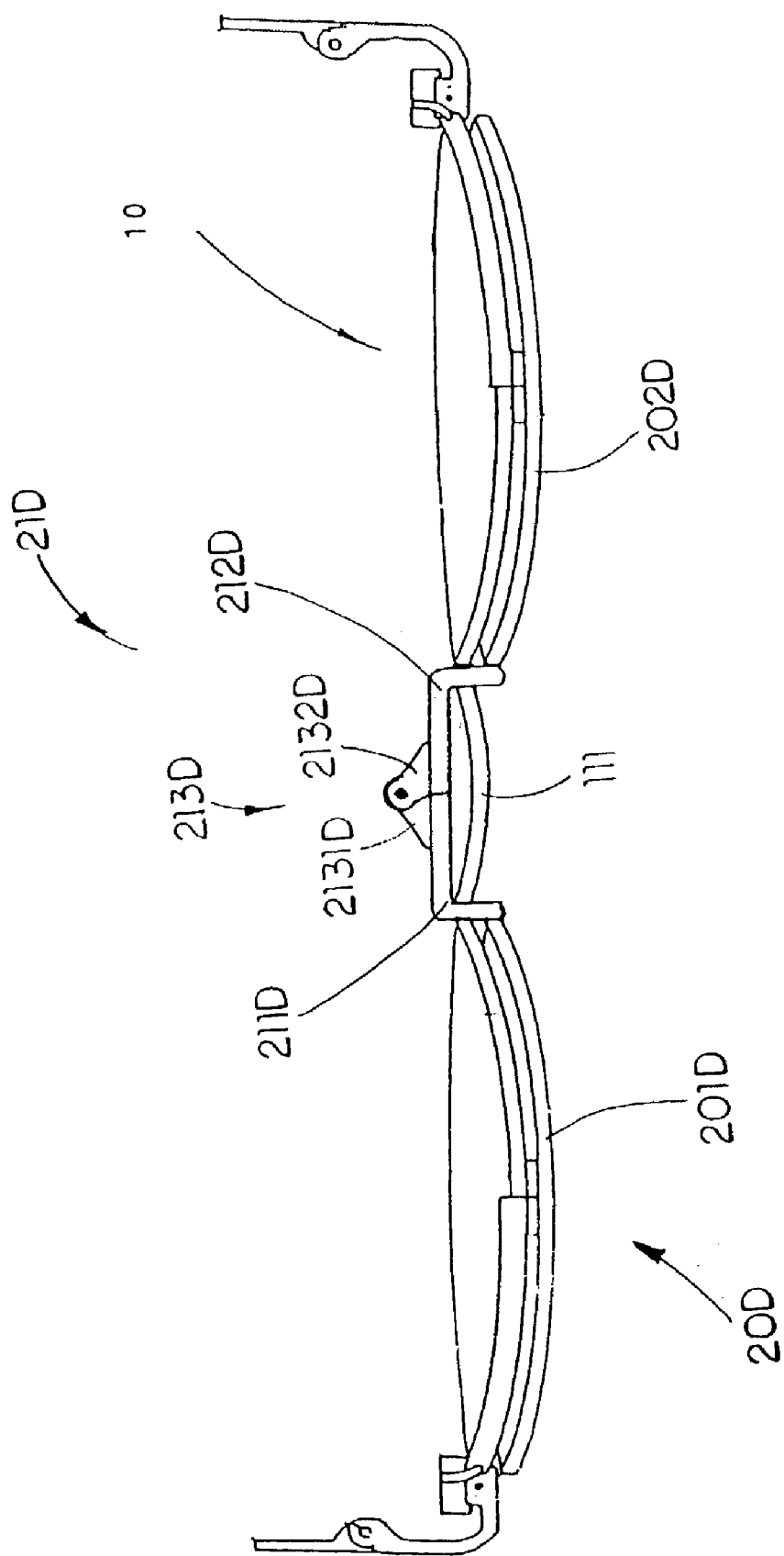
FIG. 25 is a top view of a shelter frame kit mounted on the primary spectacle frame according to a sixth preferred embodiment of the present invention.

FIG. 25 illustrates shelter frame kit 20D according to a sixth preferred embodiment of the present invention, wherein the bridge 21D comprises a first bridge member 211D extended from the one auxiliary lens 201D and a second bridge member 212D extended from another auxiliary lenses 202D, wherein the first bridge member 211D is pivotally connected to the second bridge member 212D by a locker hinge 213D for pivotally folding the shelter frame kit 20D.

Figure 26:
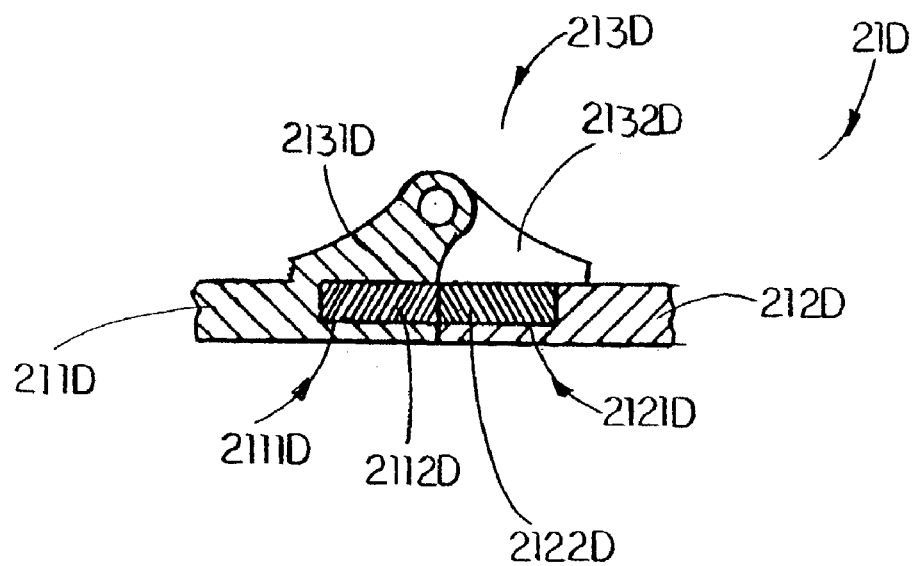
FIG. 26 is a partially sectional view of the bridge of the shelter frame kit according to the sixth preferred embodiment of the present invention.
Figure 27:
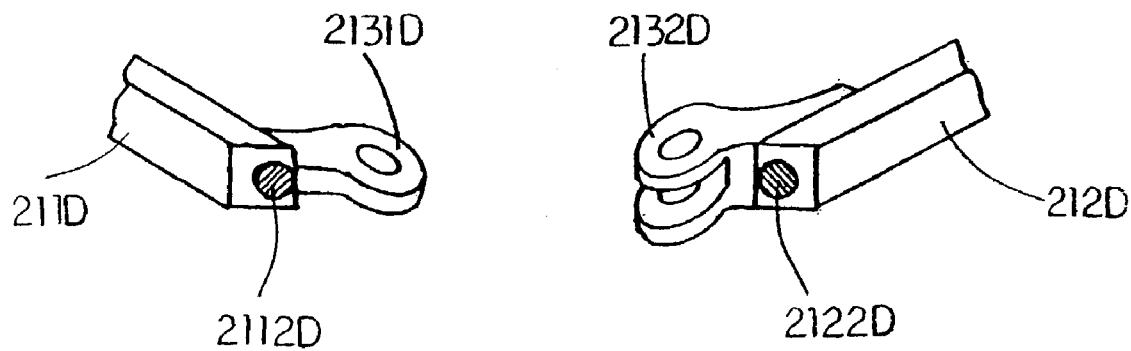
FIG. 27 is an exploded perspective view of the shelter frame kit according to the sixth preferred embodiment of the present invention.
Figure 28:
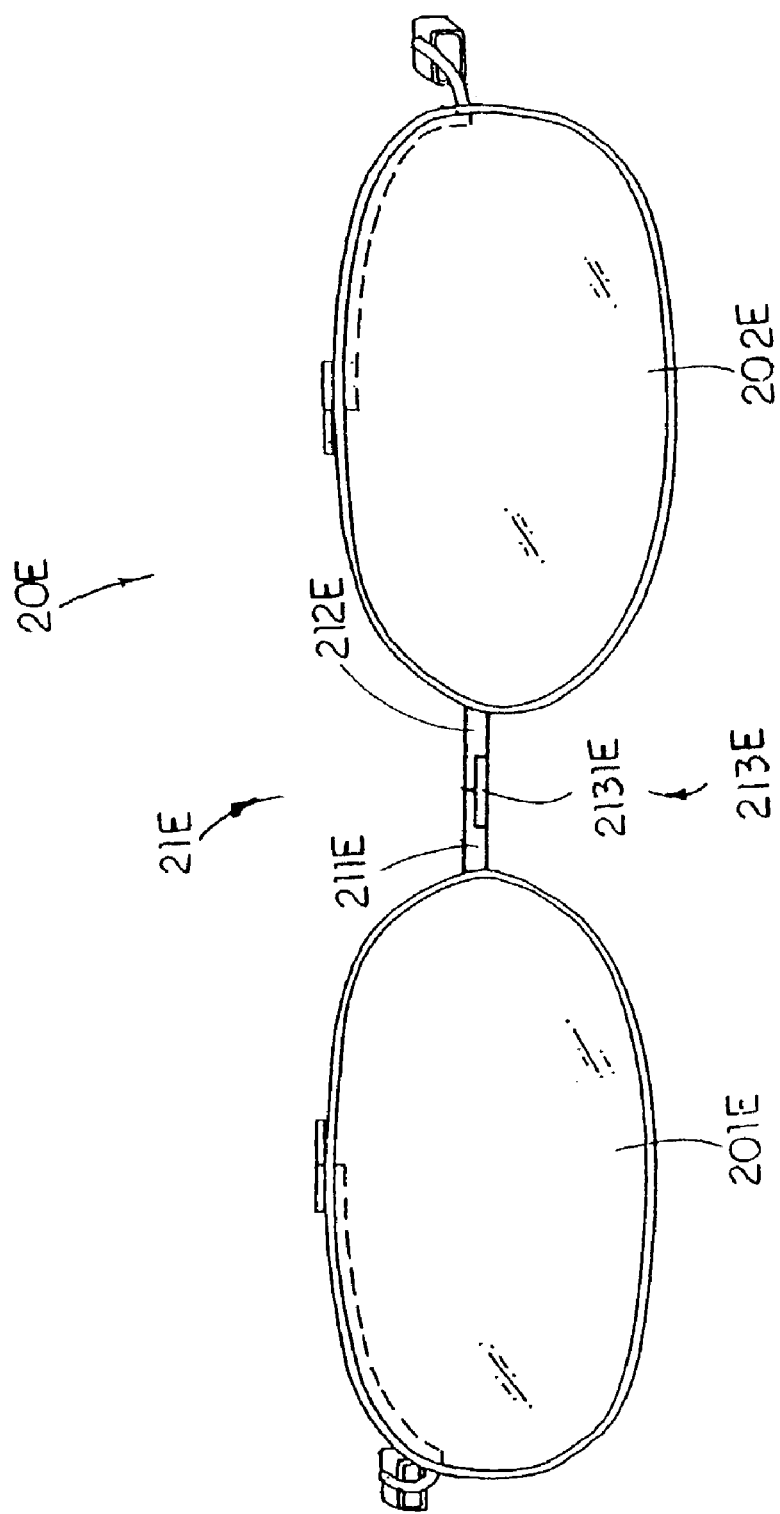
FIG. 28 is a front view of a shelter view according to a seventh preferred embodiment of the present invention.
Figure 29:
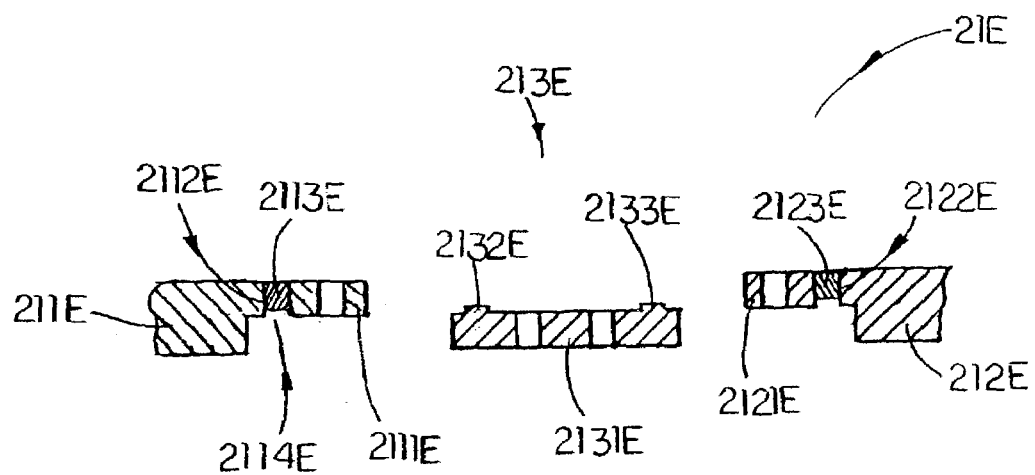
FIG. 29 is a partially sectional view of the bridge of the shelter frame kit according to the seventh preferred embodiment of the present invention.
Figure 30:
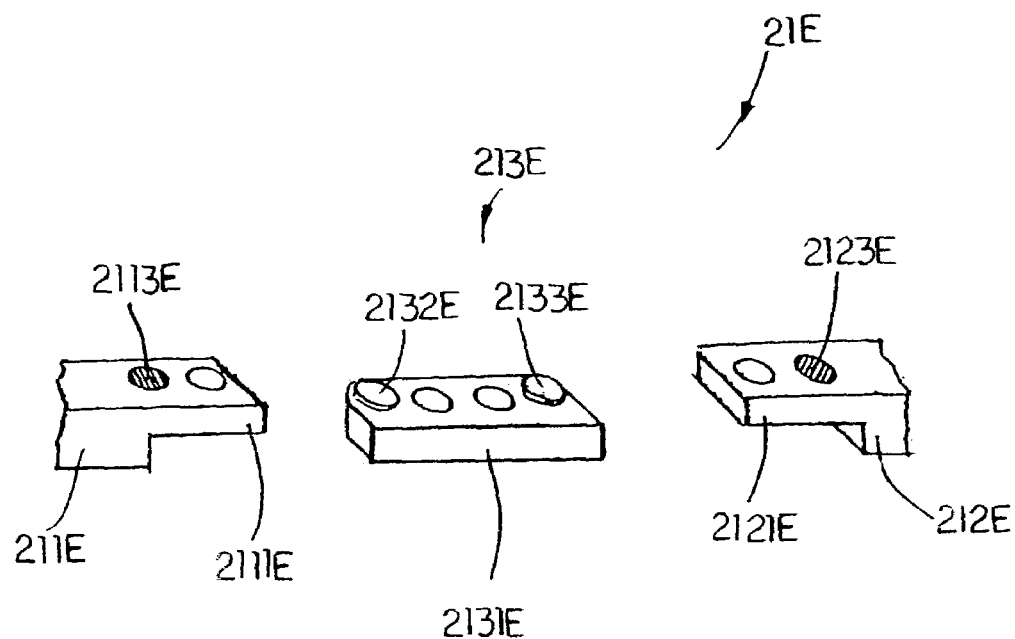
FIG. 30 is an exploded perspective view of the shelter frame kit according to the seventh preferred embodiment of the present invention.
Figure 31:
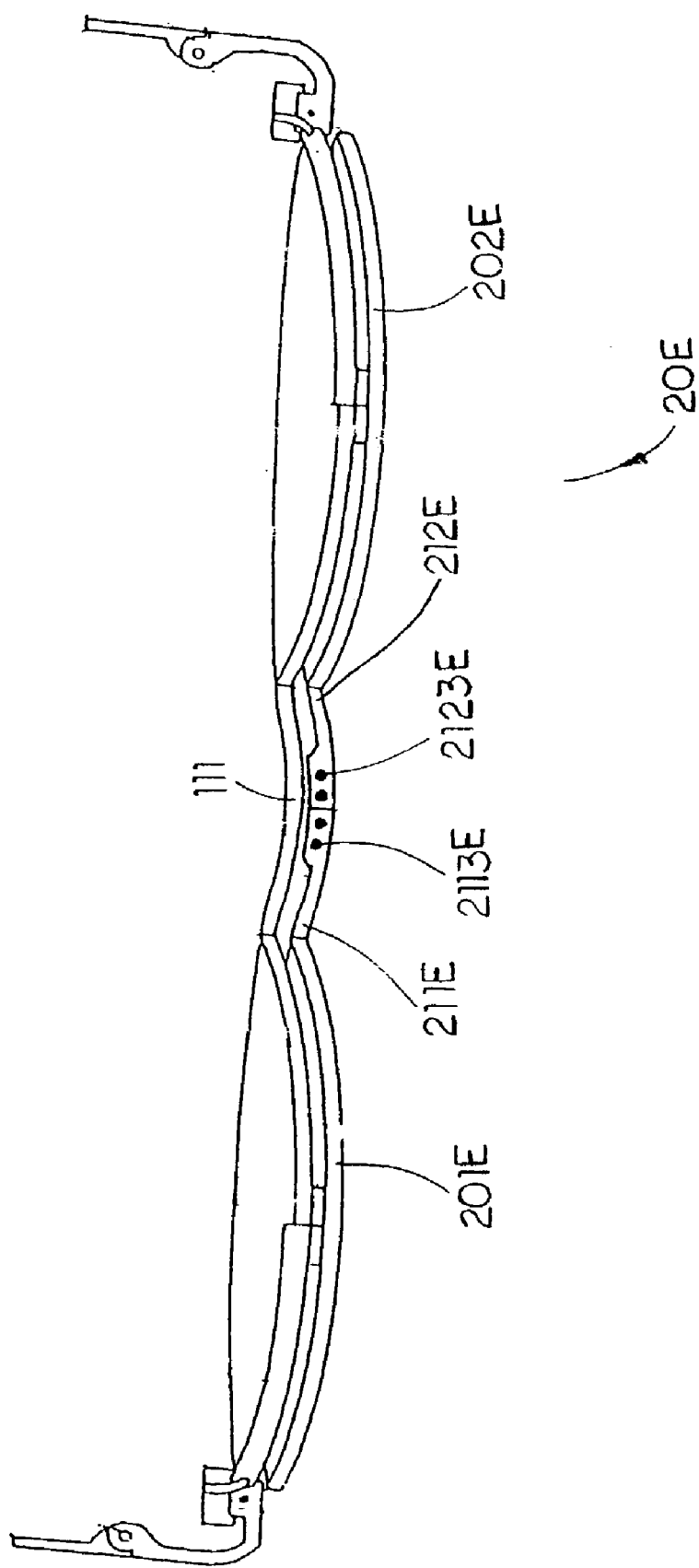
FIG. 31 is a top view of the shelter frame kit mounted on the primary spectacle frame according to the seventh preferred embodiment of the present invention.
Figure 32:
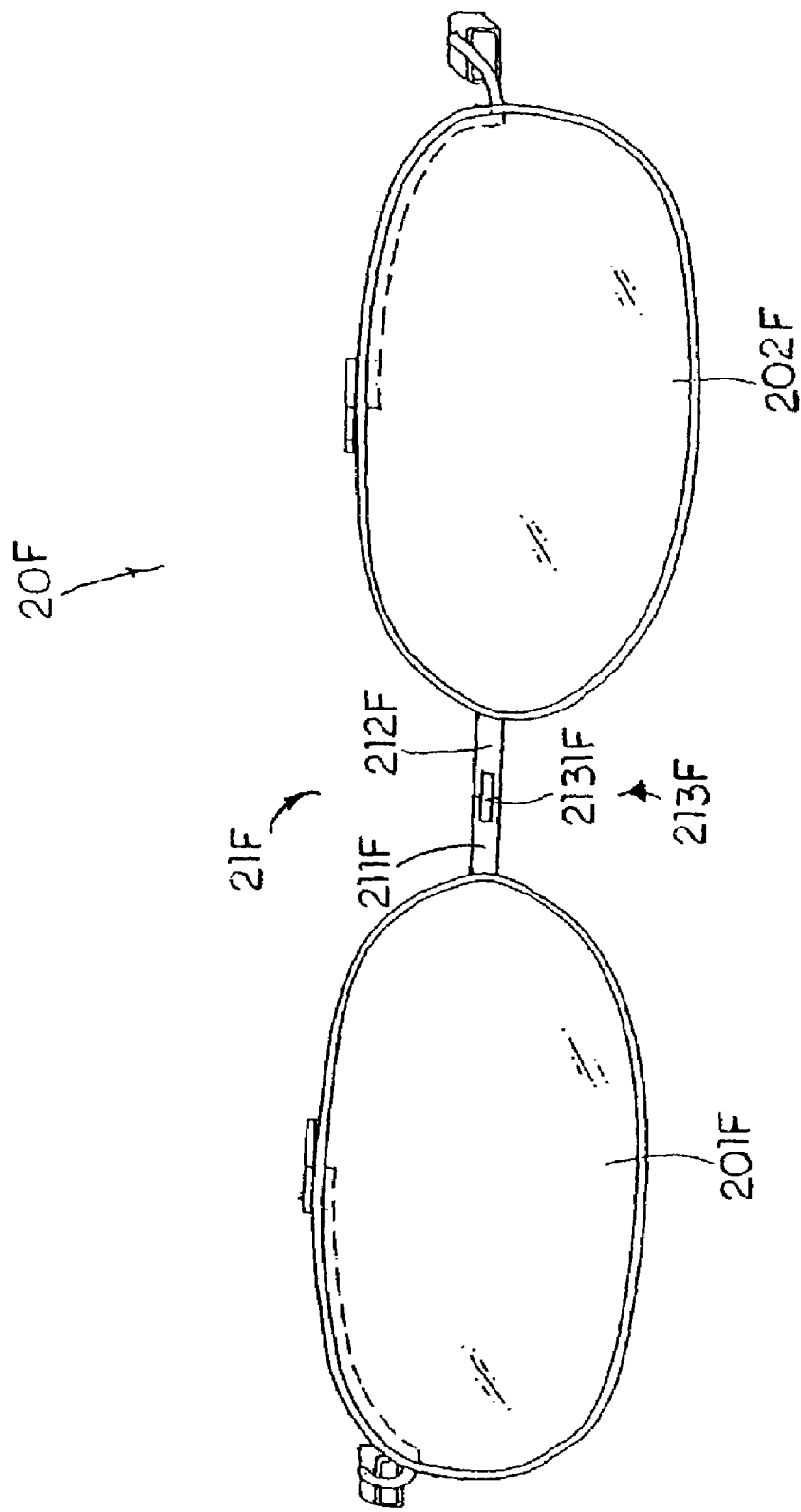
FIG. 32 is a perspective view of a shelter frame kit according to an eighth preferred embodiment of the present invention.
Figure 33:
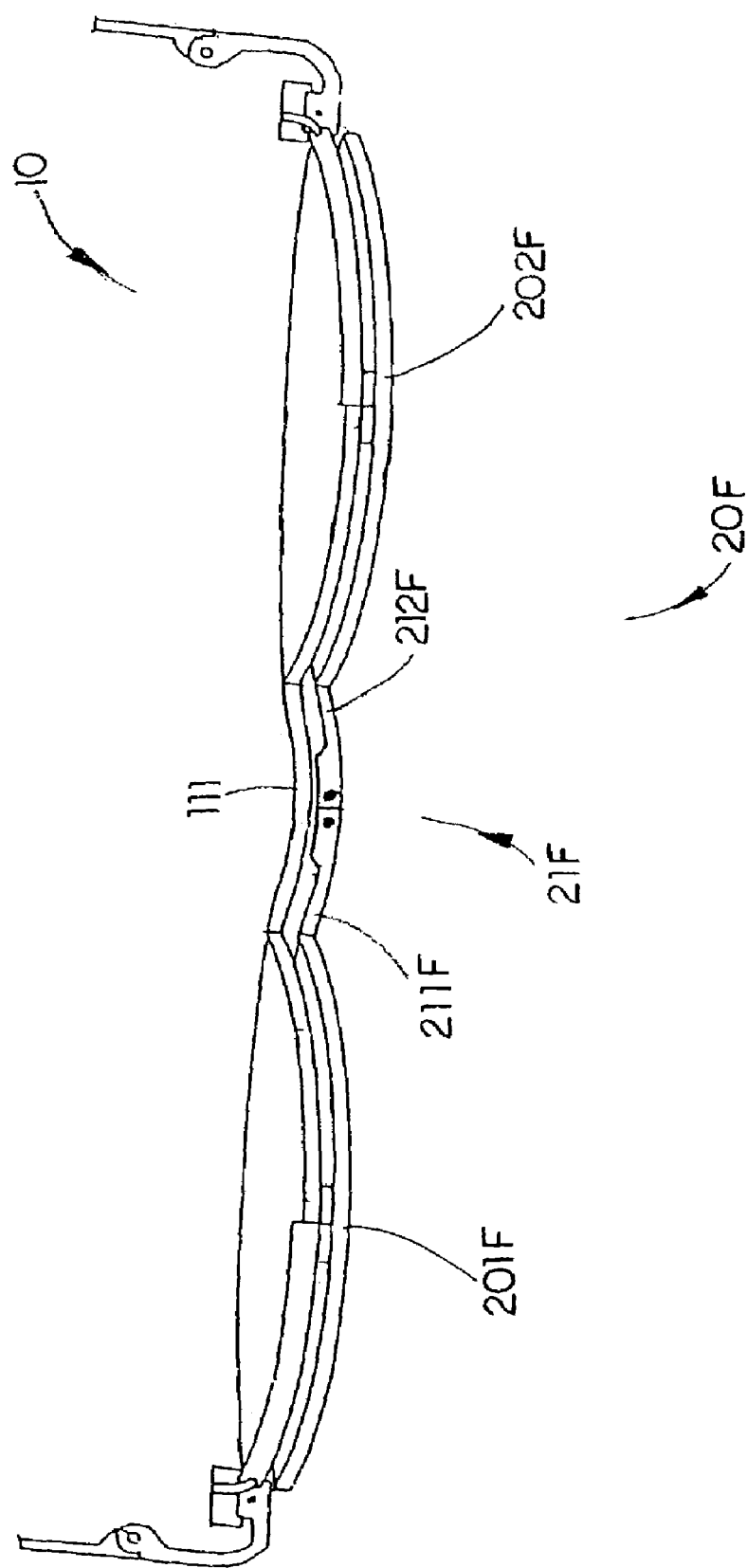
FIG. 33 is a top view of the shelter frame kit mounted on the primary spectacle frame according to the eighth preferred embodiment of the present invention.
Figure 34:
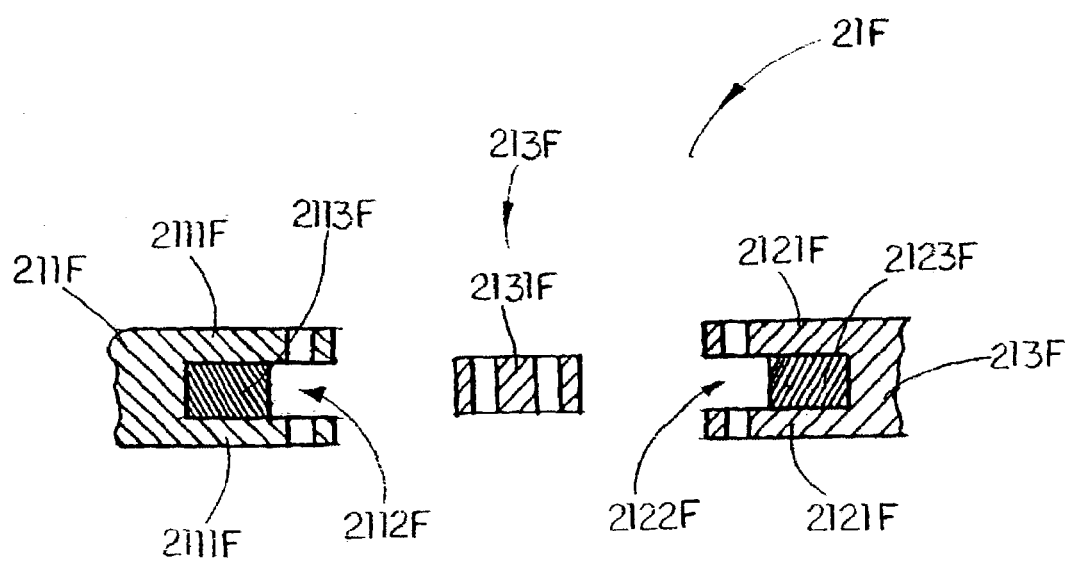
FIG. 34 is a partially sectional view of the bridge of the shelter frame kit according to the eighth preferred embodiment of the present invention.
Figure 35:
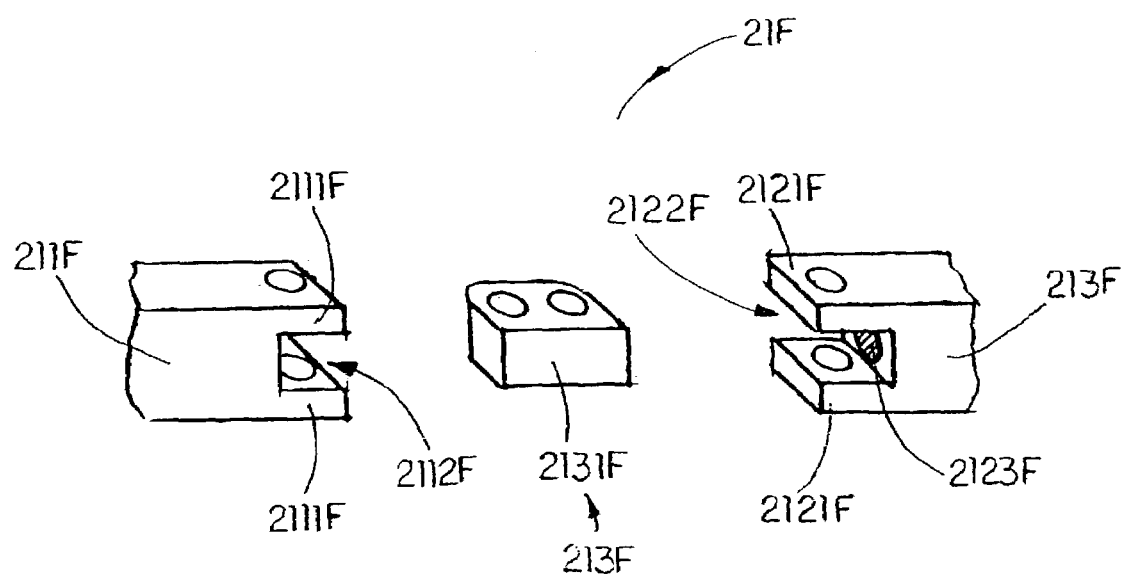
FIG. 35 is an exploded perspective view of the shelter frame kit according to the eighth preferred embodiment of the present invention.

As shown in FIGS. 26 and 27, the locker hinge 213D comprises a first pivot arm 2131D extended from an inner side of the first bridge member 211D and a second pivot arm 2132D extended from an inner side of the second bridge member 212D wherein the first and second pivot arms 2131D, 2132D are pivotally connected together in such manner that the two auxiliary lenses 201D, 202D are adapted for rearweardly and overlappedly folding so as to fold up the shelter frame kit 20D.

Accordingly, each of the first and second bridge members 211D, 212D has a receiving cavity 2111D, 2121D transversely provided thereon wherein a magnetic member 2112D, 2122D fittedly received in each receiving cavity 2111D, 2121D in such a manner the magnetic members 2112D, 2122D are magnetically attracted each other when the shelter frame kit 20D is unfolded. In other words, the magnetic members 2112D, 2122D are adapted for ensuring and guiding the magnetically attraction between the first and second bridge members 211D, 212D.

Referring to FIGS. 28 through 31, a seventh embodiment of the present invention illustrates an alternative mode of the above sixth embodiment. According to the seventh embodiment, the locker hinge 213E comprises pivot member 2131E having two ends pivotally connected to the first and second bridge members 211E, 212E respectively.

Accordingly, each of the first and second bridge members 211E, 212E comprises an extension 2111E, 2121E integrally extended therefrom to form a L-shaped structure wherein the pivot member 2131E is pivotally connected to the extension 2111E, 2121E. A receiving cavity 2112E, 2122E is vertically formed on each extension 2111E, 2121E wherein a magnetic member 2113E, 2123E is fittedly received in the respective receiving cavity 2112E, 2122E wherein a height of the magnetic member 2113E, 2123E is smaller than a depth of the receiving cavity 2112E, 2122E, so as to define an indention 2114E, 2124E when the magnetic member 2113E, 2123E is embedded in the respective receiving cavity 2112E, 2122E.

Two protrusions 2132E, 2133E having magnetically attraction abilities are integrally protruded from two ends of the pivot member 2131E wherein the two protrusions 2132E, 2133E are adapted for fittedly engaging with the two indentions 2114E, 2124E of the extensions 2111E, 2121E respectively so as to magnetically lock up the first and second bridge members 211E, 212E with the pivot member 2131E when the shelter frame kit 20E is in an unfolded position.

Referring to FIGS. 32 through 35, an eighth embodiment of the present invention illustrates another alternative mode of the above seventh embodiment. According to the eighth embodiment, each of the first and second bridge members 211F, 212F comprises a pair of parallel extensions 2111F, 2121F integrally extended from a free end thereof wherein the pivot member 2131F is pivotally connecting between the parallel extensions 2111F, 2121F, so as to overlappedly fold up the two auxiliary lenses 201F, 202F.

A receiving cavity 2112F, 2122F is transversely formed between each pair of parallel extensions 2111F, 2121F wherein a magnetic member 2113F, 2123F is fittedly received in the respective receiving cavity 2112F, 2122F in such a manner that the pivot member 2131F having magnetically attraction ability is magnetically attached to the first and second bridge members 211F, 212F so as to guide and enhance the alignment of the shelter frame kit 20F in the unfolded position.

What is claimed is:

1. A spectacle kit comprising a primary spectacle frame and a shelter frame kit detachably mounting in front of said primary spectacle;
   wherein said primary spectacle comprises a frame body for mounting a pair of lenses in position, wherein said frame body which has two soft-magnetic metal portions and comprises a primary bridge connected between said two lenses and two side extension arms provided at two outer sides of said lenses coupling two temples respectively;
   wherein said shelter frame kit which supports two auxiliary lenses in position and comprises two shelter arms having two portions pivotally hinged with said auxiliary lenses respectively, and two magnetic seats extended from said shelter arms to magnetically attract to said two soft-magnetic metal portions of said frame body respectively so as to detachably mount said shelter frame kit in front of said primary spectacle;
   wherein when said shelter frame kit is mounted in front of said primary spectacle frame, said auxiliary lenses of said shelter frame kit are adapted for pivotally folding between a closed position that said two auxiliary lenses are respectively positioned in front of said two lenses of said primary spectacle frame and an open position that said two auxiliary lenses are flipped over said two lenses of said primary spectacle frame respectively.

2. The spectacle kit, as recited in claim 1, wherein said primary spectacle frame further comprises a pair of lens rims for mounting said lenses in position, wherein each of said lens rims comprises a rim locker for securely locking up said lens within said respective lens rim, wherein said two rim lockers are made of soft-magnetic metal having magnetic attraction ability to form said two soft-magnetic metal portions of said frame body to magnetically attract said two magnetic seats of said shelter frame kit.

3. The spectacle kit, as recited in claim 2, wherein said two rim lockers are respectively connected at two outer sides of said two lens rims of said primary spectacle frame at said extension arms, wherein said two shelter arms are rearwardly extended to said two extension arms to align with said rim lockers respectively to magnetically mount said two magnetic seats with said two rim lockers respectively.

4. The spectacle kit, as recited in claim 2, wherein said two rim lockers are respectively connected at two inner sides of said two lens rims of said primary spectacle frame at said primary bridge, wherein said two shelter arms are rearwardly extended to said primary bridge to align with said rim lockers respectively to magnetically mount said two magnetic seats with said two rim lockers respectively.

5. The spectacle kit, as recited in claim 1, wherein each of said shelter arms has a pivot hinge affixed on an upper side of said respective auxiliary lens so as to allow said auxiliary lenses to upwardly flip over from said lenses of said primary spectacle respectively.

6. The spectacle kit, as recited in claim 3, wherein each of said shelter arms has a pivot hinge affixed on an upper side of said respective auxiliary lens so as to allow said auxiliary lenses to upwardly flip over from said lenses of said primary spectacle respectively.

7. The spectacle kit, as recited in claim 4, wherein each of said shelter arms has a pivot hinge affixed on an upper side of said respective auxiliary lens so as to allow said auxiliary lenses to upwardly flip over from said lenses of said primary spectacle respectively.

8. The spectacle kit, as recited in claim 5, wherein each of said magnetic seats comprises a magnetic housing which is made of non-magnetic material downwardly connected from said respective shelter arm and a magnet mounted in said magnet housing which is arranged to face toward and align with said respective rim locker of said respective lens rim when said shelter frame kit is mounted on said frame body of said primary spectacle frame.

9. The spectacle kit, as recited in claim 6, wherein each of said magnetic seats comprises a magnetic housing which is made of non-magnetic material downwardly connected from said respective shelter arm and a magnet mounted in said magnet housing which is arranged to face toward and align with said respective rim locker of said respective lens rim when said shelter frame kit is mounted on said frame body of said primary spectacle frame.

10. The spectacle kit, as recited in claim 7, wherein each of said magnetic seats comprises a magnetic housing which is made of non-magnetic material downwardly connected from said respective shelter arm and a magnet mounted in said magnet housing which is arranged to face toward and align with said respective rim locker of said respective lens rim when said shelter frame kit is mounted on said frame body of said primary spectacle frame.

11. The spectacle kit, as recited in claim 8, wherein a thickness of each of said two magnets is smaller than a depth of each of said magnet housings so as to define two engagement grooves in said magnet housings respectively when said two magnets are respectively embedded in said two magnet housings in order to engage with said two rim lockers of said primary spectacle frame.

12. The spectacle kit, as recited in claim 9, wherein a thickness of each of said two magnets is smaller than a depth of each of said magnet housings so as to define two engagement grooves in said magnet housings respectively when said two magnets are respectively embedded in said two magnet housings in order to engage with said two rim lockers of said primary spectacle frame.

13. The spectacle kit, as recited in claim 10, wherein a thickness of each of said two magnets is smaller than a depth of each of said magnet housings so as to define two engagement grooves in said magnet housings respectively when said two magnets are respectively embedded in said two magnet housings in order to engage with said two rim lockers of said primary spectacle frame.

14. The spectacle kit, as recited in claim 11, further comprising a bridge lock for holding said auxiliary lenses in the closed position, wherein said bridge lock comprises a magnet holder mounted on a mid-portion of said bridge of said shelter frame kit and a bridge magnet embedded on said magnet holder, which is arranged to face toward and align with said primary bridge which is made of soft-magnetic metal having magnetic attraction ability when said shelter frame kit is mounted in front of said primary spectacle frame.

15. The spectacle kit, as recited in claim 12, further comprising a bridge lock for holding said auxiliary lenses in the closed position, wherein said bridge lock comprises a magnet holder mounted on a mid-portion of said bridge of said shelter frame kit and a bridge magnet embedded on said magnet holder, which is arranged to face toward and align with said primary bridge which is made of soft-magnetic metal having magnetic attraction ability when said shelter frame kit is mounted in front of said primary spectacle frame.

16. A shelter frame kit for detachably mounting in front of said primary spectacle which comprises a frame body, having two soft-magnetic metal portions, for mounting a pair of lenses in position, wherein said spectacle kit comprises:

a shelter frame which supports two auxiliary lenses in position and comprises two shelter arms having two portions pivotally hinged with said auxiliary lenses respectively and two magnetic seats extended from said shelter arms for magnetically attracting to said two soft-magnetic metal portions of said frame body respectively so as to detachably mount said shelter frame kit in front of said primary spectacle, wherein said auxiliary lenses of said shelter frame kit are adapted for pivotally folding between a closed position that said two auxiliary lenses are respectively positioned in front of said two lenses of said primary spectacle frame and an open position that said two auxiliary lenses are flipped over said two lenses of said primary spectacle frame respectively.

17. The shelter frame kit, as recited in claim 16, wherein each of said shelter arms has a pivot hinge affixed on an upper side of said respective auxiliary lens so as to allow said auxiliary lenses to upwardly flip over from said lenses of said primary spectacle respectively.

18. The shelter frame kit, as recited in claim 17, wherein each of said magnetic seats comprises a magnetic housing which is made of non-magnetic material downwardly connected from said respective shelter arm and a magnet mounted in said magnet housing which is arranged to face toward and align with said respective rim locker of said respective lens rim when said shelter frame kit is mounted on said frame body of said primary spectacle frame.

19. The shelter frame kit, as recited in claim 18, wherein said two shelter arms are rearwardly extended from said shelter frame towards two extension arms of said primary spectacle that said two soft-magnetic metal portions are provided thereon respectively for aligning said two magnetic seats to magnetically mount with said two extension arms of said primary spectacle respectively.

20. The spectacle kit, as recited in claim 18, wherein said two shelter arms are rearwardly extended from said shelter frame towards a primary bridge of said primary spectacle that said two soft-magnetic metal portions are provided thereon for aligning said two magnetic seats to magnetically mount with said bridge of said primary spectacle.

* * * * *